US012633819B2

(12) United States Patent
Chen et al.

(10) Patent No.: US 12,633,819 B2
(45) Date of Patent: May 19, 2026

(54) POWER CONVERTER, PROTECTION METHOD, AND SYSTEM

(71) Applicant: Huawei Digital Power Technologies Co., Ltd., Futian District (CN)

(72) Inventors: Baoguo Chen, Dongguan (CN); Wing Cong Cheung, Dongguan (CN); Pengpeng Yu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 304 days.

(21) Appl. No.: 18/316,392

(22) Filed: May 12, 2023

(65) Prior Publication Data

US 2023/0283169 A1     Sep. 7, 2023

Related U.S. Application Data

(63) Continuation of application No. PCT/CN2021/115899, filed on Sep. 1, 2021.

(30) Foreign Application Priority Data

Nov. 12, 2020    (CN) .......................... 202011263702.0

(51) Int. Cl.
*H02M 1/32*        (2007.01)
*H02M 3/158*        (2006.01)
       (Continued)

(52) U.S. Cl.
CPC ............. *H02M 1/32* (2013.01); *H02M 3/158* (2013.01); *H02M 5/4585* (2013.01); *H02M 7/06* (2013.01)

(58) Field of Classification Search
CPC ...... H02M 1/32; H02M 1/007; H02M 1/0085; H02M 1/36; H02M 1/4225; H02M 3/158;
       (Continued)

(56) References Cited

U.S. PATENT DOCUMENTS 5,627,738 A      5/1997  Lubomirsky et al.
2014/0293666 A1 * 10/2014  Merz ........................ H02M 1/32
                                                                361/13

FOREIGN PATENT DOCUMENTS

CN         102422519 A     4/2012
CN         102545666 A  *  7/2012  ............... H02H 3/20
       (Continued)

OTHER PUBLICATIONS

CN102545666 Translation (Year: 2012).*
       (Continued)

*Primary Examiner* — Crystal L Hammond
*Assistant Examiner* — Jennifer C Caulk
(74) *Attorney, Agent, or Firm* — Maier & Maier, PLLC

(57) ABSTRACT

A power converter includes a protection circuit, a controller, and a power conversion circuit. The protection circuit includes a first positive temperature coefficient (PTC) resistor, a first switch unit, and a second switch unit. The power conversion circuit includes a direct current bus, and the direct current bus includes a positive direct current bus and a negative direct current bus. The first switch unit is connected between a power supply and an input end of the power conversion circuit or is connected in series on the direct current bus of the power conversion circuit. The first PTC resistor is connected in parallel to the first switch unit. The second switch unit is connected in parallel between a positive port and a negative port of the input end of the power conversion circuit or is connected in parallel between the positive direct current bus and the negative direct current bus.

16 Claims, 9 Drawing Sheets

(51) Int. Cl.
    *H02M 5/458*       (2006.01)
    *H02M 7/06*       (2006.01)

(58) Field of Classification Search
    CPC .... H02M 3/1586; H02M 5/4585; H02M 7/06;
                                         H02H 7/1213
    See application file for complete search history.

(56)                References Cited

FOREIGN PATENT DOCUMENTS

| CN | 203014691 U | | 6/2013 | |
| CN | 105071652 A | | 11/2015 | |
| CN | 206211522 U | | 5/2017 | |
| CN | 207967930 U | * | 10/2018 | |
| CN | 109194107 A | | 1/2019 | |
| CN | 109217708 A | * | 1/2019 | ............ H02M 7/537 |
| CN | 109861356 A | * | 6/2019 | ............. H02M 1/42 |
| GB | 2501107 A | * | 10/2013 | ............. H02M 1/36 |
| WO | WO-2015140825 A1 | * | 9/2015 | ............. B60L 53/20 |

OTHER PUBLICATIONS

CN207967930 Translation (Year: 2018).*
CN109217708 Translation (Year: 2019).*
CN_109861356_A_Translation (Year: 2019).*

\* cited by examiner

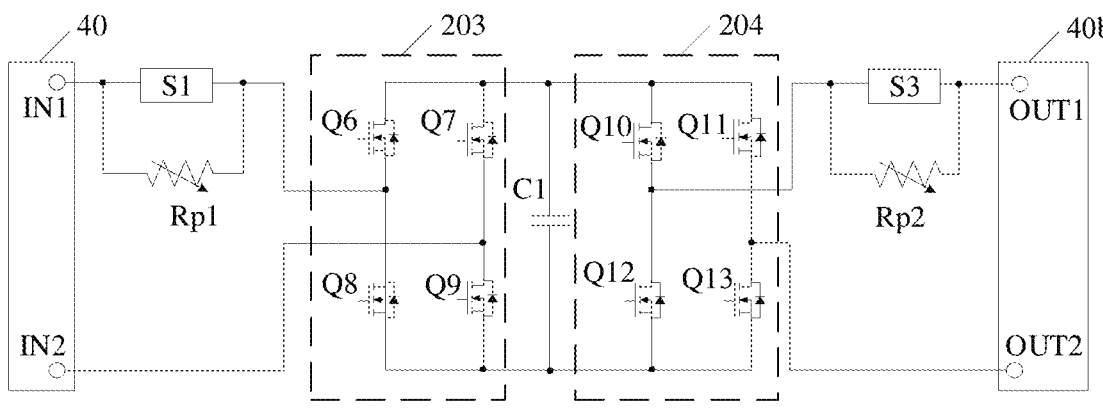

Determine, by using at least one of a first sampling signal for an input voltage of a power supply or a second sampling signal for a voltage of a direct current bus, whether an overvoltage exists

S1502

When it is determined that an overvoltage exists, control a first switch unit to be turned off, and control a working status of a controllable switch tube to charge a bus capacitor of a power conversion circuit

FIG. 15

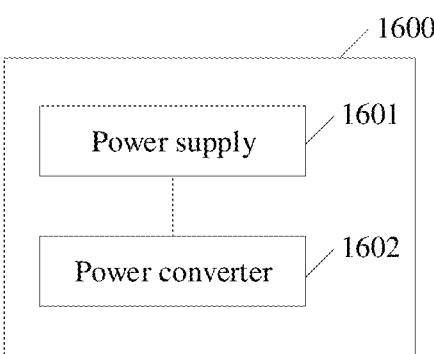

FIG. 16

POWER CONVERTER, PROTECTION METHOD, AND SYSTEM

CROSS-REFERENCE TO RELATED APPLICATIONS

This application is a continuation of International Application No. PCT/CN2021/115899, filed on Sep. 1, 2021, which claims priority to Chinese Patent Application No. 202011263702.0, filed on Nov. 12, 2020. The disclosures of the aforementioned applications are hereby incorporated by reference in their entireties.

TECHNICAL FIELD

The embodiments relate to the field of power electronics technologies, a power converter, a protection method, and a system.

BACKGROUND

A power converter is configured to supply required power to a load. The power converter may be a direct current (DC)-DC converter, an alternating current (AC)-DC converter, a DC-AC converter, an AC-DC-AC converter, and the like. Surge current suppression and an overvoltage protection circuit can implement soft-start of the power converter and protect a circuit of the power converter when an overvoltage fault occurs at an input/output end and are widely used in various power converters.

FIG. 1 is a schematic diagram of a power converter in the conventional technology.

The power converter includes a protection circuit 10 and a power conversion circuit 20. The power conversion circuit 20 includes a bus capacitor C1. The protection circuit 10 is configured to perform surge current suppression and overvoltage protection, and the power conversion circuit 20 is configured to perform power conversion on an input alternating current. The protection circuit 10 includes a cement resistor R1, a normally open relay K1, and a normally closed relay K2. For example, the power converter is connected to an input of a direct current power supply. R1 and K1 are first connected in series on a direct current bus and then are connected in parallel to K2. At a moment of power-on of the protection circuit 10, K1 is turned off and K2 is turned on. After passing through R1 and K2, the direct current input performs current-limiting charging on the bus capacitor C1. When a voltage of the direct current bus capacitor C1 reaches a threshold, K1 is turned on, so that R1 is bypassed, input soft-start ends, and power can be output.

In a long-term overvoltage condition, because controllers of most power conversion circuits obtain power from the bus capacitor C1, when K1 maintains off, K2 needs to be repeatedly switched between an on state and an off state, and current-limiting charging is performed on the bus capacitor C1 by using R1, to maintain voltages at two ends of the bus capacitor C1 in a proper range. However, repeatedly switching a switch in a long-term overvoltage condition affects a mechanical life of the relay K2 and causes adhesion and sparking of the relay K2. As a result, an overvoltage detachment may fail, and reliability is reduced. In addition, because K2 needs to adapt to a large charging current, a size of K2 is large, which is not conducive to miniaturization of the power converter.

SUMMARY

To resolve the foregoing problem existing in the conventional technology, the embodiments may provide a power converter, a protection method, and a system, to improve reliability of the power converter and facilitate miniaturization of the power converter.

According to a first aspect, the embodiments may provide a power converter, configured to convert a voltage and a current. The power converter includes a protection circuit, a controller, and a power conversion circuit. The protection circuit is configured to perform surge current suppression and overvoltage protection. The protection circuit may include a first positive temperature coefficient (PTC) resistor, a first switch unit, and a second switch unit. The power conversion circuit includes a direct current bus, and the direct current bus includes a positive direct current bus and a negative direct current bus. The first switch unit is connected between a power supply and an input end of the power conversion circuit or is connected in series on the direct current bus of the power conversion circuit. The first switch unit is connected in parallel to the first PTC resistor. The second switch unit is connected in parallel between a positive port and a negative port of the input end of the power conversion circuit, or is located in the power conversion circuit, for example, connected in parallel between the positive direct current bus and the negative direct current bus in the power conversion circuit. The second switch unit includes a controllable switching transistor. As a control unit, the controller is configured to control controllable switching transistors in the first switch unit and the second switch unit.

In a possible implementation, the controllable switching transistor includes an insulated gate bipolar transistor (IGBT), a metal-oxide semiconductor field-effect transistor (MOSFET), or a silicon carbide field-effect transistor (SiC MOSFET).

In a possible implementation, the controller sends a pulse width modulation (PWM) signal or a pulse frequency modulation (PFM) signal to the controllable switching transistor, to control a working status of the controllable switching transistor.

The power converter implements an input soft-start requirement by using a feature that a PTC resistor has a positive temperature coefficient, current-limiting charging is performed on the direct current bus by using the first PTC resistor, and the PTC resistor does not need to be connected in series to an additional relay. Compared with the conventional technology, a quantity of used relays is decreased, and costs of the power converter are reduced, thereby facilitating miniaturization of the power converter. The first PTC resistor may further limit a current flowing through the second switch unit, so that in a long-term overvoltage condition, a bus capacitor can be charged by controlling the working status of the controllable switching transistor with a small rated current, and the controller of the power converter can normally obtain power to avoid using a relay, thereby avoiding adhesion and sparking. Therefore, reliability of the power converter is further improved.

In a possible implementation, when determining that at least one of the following is met: a voltage of the power supply is greater than a first voltage threshold, or a voltage of the direct current bus is greater than a second voltage threshold, the controller controls the first switch unit to be turned off and controls the controllable switching transistor to charge the bus capacitor of the power conversion circuit.

The controller may determine a value relationship between the voltage of the external power supply and the first voltage threshold based on a first sampling signal for an input voltage of the power supply, and the controller determines a value relationship between the voltage of the direct current bus and the second voltage threshold based on a second sampling signal for the voltage of the direct current bus.

When an overvoltage occurs in an alternating current input in a working process of the power converter, over- voltage detachment control is performed. The first switch unit is controlled to be turned off, so that the first PTC resistor accesses the circuit to limit a current. In addition, the working status of the controllable switching transistor is switched, so that a voltage of the bus capacitor maintains in a proper range, to ensure that the bus capacitor can always supply power normally in a long-term overvoltage condi- tion.

In a possible implementation, when determining, based on the second sampling signal, that the voltage of the direct current bus is less than a third voltage threshold, the con- troller controls the controllable switching transistor to charge the bus capacitor; and when determining, based on the second sampling signal, that the voltage of the direct current bus is greater than or equal to a fourth voltage threshold, the controller controls the controllable switching transistor to stop charging the bus capacitor. The third voltage threshold is less than the fourth voltage threshold, and the fourth voltage threshold is less than or equal to the second voltage threshold.

In a possible implementation, the controllable switching transistor included in the second switch unit is a controllable switching transistor of the power conversion circuit, so that costs can be reduced and space can be saved.

In a possible implementation, the power supply is an alternating current power supply, the power conversion circuit includes a full-bridge rectifier circuit and a boost circuit, and the boost circuit includes a first inductor, a first diode, a first switching transistor, and the bus capacitor. A first output end of the full-bridge rectifier circuit is con- nected to a first end of the first inductor, a second end of the first inductor is connected to a second output end of the full-bridge rectifier circuit by using the first switching tran- sistor, the second end of the first inductor is connected to an anode of the first diode, a cathode of the first diode is connected to a first end of the bus capacitor, and the second output end of the full-bridge rectifier circuit is connected to a second end of the bus capacitor. The second switch unit is the first switching transistor, that is, a topology structure of the power conversion circuit is a boost type bridged power factor correction (PFC) circuit.

When determining that the voltage of the direct current bus is less than the third voltage threshold, the controller controls the first switching transistor to be turned off, to perform current-limiting charging on the bus capacitor; and when determining that the voltage of the direct current bus is greater than or equal to the fourth voltage threshold, the controller controls the first switching transistor to be turned on, to bypass the bus capacitor and stop charging the bus capacitor.

In a possible implementation, the power supply is an alternating current power supply, the power conversion circuit includes a full-bridge rectifier circuit and a boost circuit, and the boost circuit includes a second inductor, a third inductor, a second diode, a third diode, a second switching transistor, a third switching transistor, and the bus capacitor. A first output end of the full-bridge rectifier circuit is connected to a first end of the second inductor and a first end of the third inductor, a second end of the second inductor is connected to a second output end of the full-bridge rectifier circuit by using the second switching transistor, a second end of the third inductor is connected to the second output end of the full-bridge rectifier circuit by using the third switching transistor, the second end of the second inductor is connected to an anode of the second switching transistor, a cathode of the second diode is connected to a first end of the bus capacitor, the second end of the third inductor is connected to an anode of the third diode, a cathode of the third diode is connected to the first end of the bus capacitor, and the second output end of the full-bridge rectifier circuit is connected to a second end of the bus capacitor. The second switch unit includes the second switching transistor and the third switching transistor, that is, a topology structure of the power conversion circuit is an interleaved parallel type bridged PFC circuit.

When determining that the voltage of the direct current bus is less than the third voltage threshold, the controller controls the second switching transistor and the third switch- ing transistor to be turned off, or controls the second switching transistor and the third switching transistor to be alternately turned on, to perform current-limiting charging on the bus capacitor; and when determining that the voltage of the direct current bus is greater than or equal to the fourth voltage threshold, the controller further controls both the second switching transistor and the third switching transistor to be turned on, to bypass the bus capacitor and stop charging the bus capacitor.

In a possible implementation, the first switch unit is located between the power supply and an input end of the full-bridge rectifier circuit or located between an output end of the full-bridge rectifier circuit and the boost circuit.

In a possible implementation, the power supply is an alternating current power supply, the power conversion circuit is a boost circuit, and the boost circuit includes a fourth inductor, a fourth switching transistor, a fifth switch- ing transistor, a fourth diode, a fifth diode, and the bus capacitor. A first end of the fourth inductor is connected to a first end of the power supply by using the first PTC resistor, a second end of the fourth inductor is connected to a first end of the bus capacitor by using the fourth switching transistor, the second end of the fourth inductor is connected to a second end of the bus capacitor by using the fifth switching transistor, an anode of the fourth diode is connected to a cathode of the fifth diode and a second end of the power supply, a cathode of the fourth diode is connected to the first end of the bus capacitor, and an anode of the fifth diode is connected to the second end of the bus capacitor. The second switch unit includes the fourth switching transistor and the fifth switching transistor, that is, a topology structure of the power conversion circuit is a bridgeless boost type PFC circuit.

When determining that the voltage of the direct current bus is less than the third voltage threshold, if a voltage at the first end of the power supply is greater than a voltage at the second end of the power supply, the controller controls the fourth switching transistor to be turned on and controls the fifth switching transistor to be turned off.

In a possible implementation, the power supply is a direct current power supply, and the power conversion circuit is one of a boost circuit, a buck circuit, a buck-boost circuit, a full-bridge circuit, a forward conversion circuit, a phase- shift full-bridge conversion circuit, or an LLC resonant conversion circuit. In this case, the power converter is a DC-DC converter.

In a possible implementation, the power supply is a direct current power supply, and the power conversion circuit is a DC-AC circuit. In this case, the power converter is an inverter.

In a possible implementation, the power supply is an alternating current power supply, the power conversion circuit is an AC-DC-AC circuit, and the power conversion circuit includes a rectifier circuit, an inverse conversion circuit, and the bus capacitor. The protection circuit further includes a second PTC resistor, a third switch unit, and a fourth switch unit. The second PTC resistor is connected in series between a first output end of the inverse conversion circuit and a first output end of the power converter, and the third switch unit is connected in parallel to the second PTC resistor. The second switch unit includes a controllable switching transistor in the rectifier circuit, and the fourth switch unit includes a controllable switching transistor in the inverse conversion circuit.

When determining that the voltage of the direct current bus is less than the third voltage threshold, the controller controls the second switch unit and the fourth switch unit to charge the bus capacitor; and when determining that the voltage of the direct current bus is greater than or equal to the fourth voltage threshold, the controller controls the second switch unit and the fourth switch unit to stop charging the bus capacitor.

In a possible implementation, an output end of the power conversion circuit is connected to a power grid. When determining, based on a third sampling signal at the output end of the power conversion circuit, that an overvoltage occurs in the power grid, the controller controls the third switch unit to be turned off, and controls the controllable switching transistor included in the fourth switch unit, so that the output end of the power conversion circuit is disconnected from the direct current bus, thereby providing corresponding protection for the converter when an overvoltage fault occurs in a voltage of the power grid.

In a possible implementation, the controller is further configured to control a working status of the power conversion circuit, that is, the controller is integrated with a controller of the power conversion circuit.

In a possible implementation, the first switch unit is a relay, or a controllable switching transistor and a relay that are connected in parallel. The controllable switching transistor has features of a low control delay and high sensitivity, and the relay has a strong current withstanding capability. The first switch unit connects the controllable switching transistor and the relay in parallel, so that a turn-on delay of the first switch unit is reduced, and the first switch unit has a strong current withstanding capability.

In a possible implementation, the power converter further includes a driving circuit. The driving circuit is configured to change working statuses of the first switch unit and the second switch unit under control of the controller.

In a possible implementation, the second switch unit may be separately disposed. In this case, the second switch unit includes one controllable switching transistor or a plurality of controllable switching transistors connected in parallel.

According to a second aspect, the embodiments may further provide a method for protecting a power converter, applied to the power converter provided in the foregoing implementations. The method includes the following steps:

when determining, by using at least one of a first sampling signal for an input voltage of the power supply or a second sampling signal for a voltage of the direct current bus, that an overvoltage exists, controlling the first switch unit to be turned off, and controlling the controllable switching transistor to charge the bus capacitor of the power conversion circuit.

According to a third aspect, the embodiments may further provide a power supply system. The power supply system includes a power converter and an alternating current power supply. The alternating current power supply is connected to an input end of the power converter and is configured to provide an alternating current for the power converter. A power conversion circuit of the power converter may be an AC-DC circuit or an AC-DC-AC circuit.

According to a fourth aspect, the embodiments may further provide a power supply system. The power supply system includes a power converter and a direct current power supply. The direct current power supply is connected to an input end of the power converter and is configured to provide a direct current for the power converter. A power conversion circuit of the power converter may be a DC-AC circuit or a DC-DC circuit.

In a possible implementation, the direct current power supply is a battery pack or a photovoltaic module. In other words, the power supply system may be applied to a scenario in which a battery supplies power or a photovoltaic power generation system.

BRIEF DESCRIPTION OF THE DRAWINGS

FIG. 14 is a schematic diagram of an AC-DC-AC converter according to an embodiment;

FIG. 15 is a flowchart of a method for protecting a power converter according to an embodiment;

FIG. 16 is a schematic diagram of a power supply system according to an embodiment;

DETAILED DESCRIPTION OF THE EMBODIMENTS

To make a person skilled in the art better understand the embodiments, the following first describes application scenarios and working principles of a surge current suppression circuit and an overvoltage protection circuit.

Figure 1:
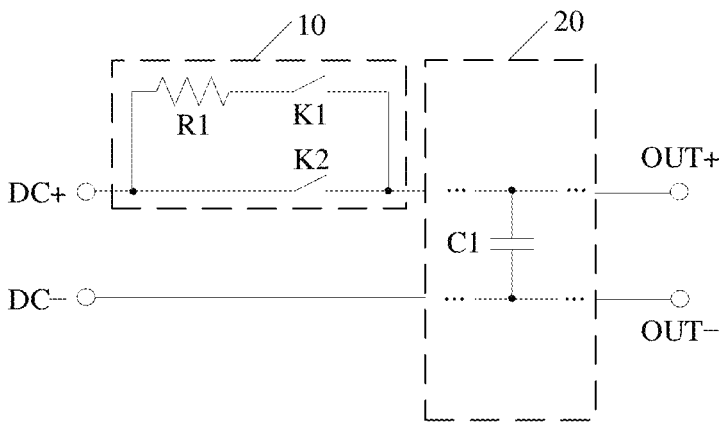
FIG. 1 is a schematic diagram of a power converter in the conventional technology.

Still referring to FIG. 1, the bus capacitor C1 of the power converter may be an electrolytic capacitor with a large capacitance value. If there is no input soft-start circuit, a large surge current is generated when the electrolytic capacitor is charged at a moment of power-on of the power converter. The surge current is prone to cause a fuse in the power converter to be blown, and a circuit breaker connecting an input side and the power converter to trip. In addition, if there is no overvoltage protection circuit, when an overvoltage occurs in an input of a power supply or an overvoltage occurs due to an internal fault of the power converter or a wiring error, a component inside the power converter is prone to be damaged. To protect the power converter when the foregoing case occurs, a surge current suppression circuit and an overvoltage protection circuit, that is, the protection circuit 10 in the figure, may be added to the power converter.

Currently, to ensure that a controller can work for a long time in a long-term overvoltage condition, on/off of the relay K2 is controlled to implement current-limiting charging on the bus capacitor. During charging, a large instantaneous charging current flows through the cement resistor R1, and consequently the cement resistor R1 heats seriously, which affects the cement resistor R1 and a surrounding component and reduces system reliability.

In addition, during an overvoltage, a working status of the relay K2 is continuously switched, and a mechanical life of the relay K2 is shortened. As a result, adhesion and sparking are prone to occur in the relay K2, and overvoltage detachment may fail, which reduces reliability. In addition, because K2 needs to adapt to a large charging current, a size of K2 is large, which is not conducive to miniaturization of the power converter.

To resolve the foregoing problem, the embodiments may provide a power converter, a protection method, and a system. A protection circuit of the power converter uses a feature of a positive temperature coefficient of a PTC resistor to implement an input soft-start requirement. The PTC resistor does not need to be connected in series to an additional relay, so that a quantity of used relays is decreased, and costs of the power converter are reduced, thereby facilitating miniaturization of the power converter. In addition, adhesion and sparking are prevented from occurring in a relay to affect reliability, thereby improving reliability of the power converter. In a long-term overvoltage condition, a bus capacitor is charged by controlling a working status of a controllable switching transistor with a small rated current, so that a controller of the power converter can keep working and can implement self-recovery after a fault is eliminated.

The following describes the embodiments with reference to the accompanying drawings.

The terms such as "first" and "second" in the description are merely used for the purpose of description and cannot be understood as an indication or implication of relative importance or an implicit indication of a quantity of indicated features.

The term "connection" should be understood in a broad sense. For example, the "connection" may be a fixed connection, may be a detachable connection or in an integrated structure, may be a direct connection, or may be an indirect connection through an intermediate medium.

The embodiments may provide a power converter. An input end of the power converter is externally connected to a power supply, and the power supply may provide a direct current input or an alternating current input. This is not limited in the embodiments. The following provides a description with reference to the accompanying drawings.

Figure 2:
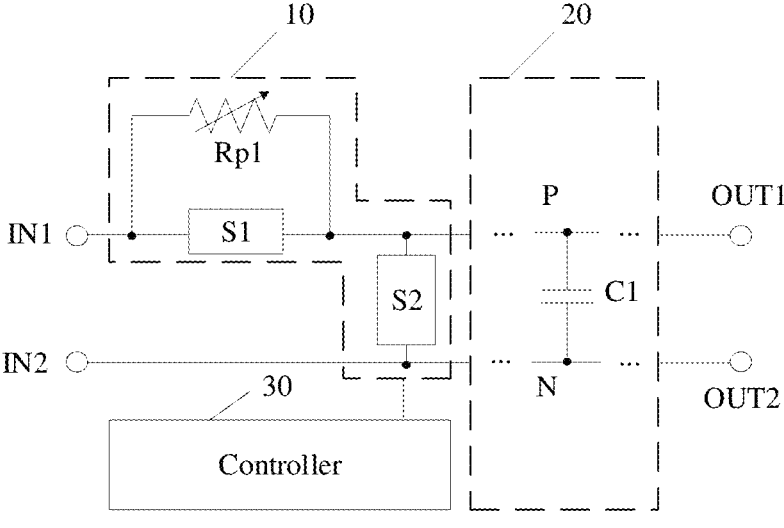
FIG. 2 is a schematic diagram of a power converter according to an embodiment.

FIG. 2 is a schematic diagram of a power converter according to an embodiment.

The power converter shown in the figure includes a protection circuit 10, a power conversion circuit 20, and a controller 30.

The protection circuit 10 is configured to perform surge current suppression and overvoltage protection, and the protection circuit 10 includes a first PTC resistor Rp1, a first switch unit S1, and a second switch unit S2.

A PTC resistor is a semiconductor resistor sensitive to temperature. When the temperature exceeds a value, a resistance value of the PTC resistor increases step by step as the temperature increases.

The first switch unit S1 in FIG. 2 is connected between an input end and an input end of the power conversion circuit 20, and the first PTC resistor Rp1 is connected in parallel to the first switch unit S1.

The input end of the power conversion circuit includes a positive port and a negative port. The second switch unit S2 is connected in parallel at the input end of the power conversion circuit, that is, connected in parallel between the positive port and the negative port of the input end of the power converter. The second switch unit S2 includes a controllable switching transistor.

The following describes a working principle of the protection circuit.

When an input of a power supply is a direct current, the power converter may be a DC-DC converter, which is configured to output a direct current; or may be a DC-AC converter (which may also be referred to as an inverter), which is configured to output an alternating current.

When the input of the power supply is an alternating current, the power converter may be an AC-DC converter (which may also be referred to as a rectifier), which is configured to output a direct current; or may be an AC-DC-AC converter (which may also be referred to as an alternating current-direct current-alternating current converter), which is configured to output an alternating current.

The power conversion circuit 20 of the power converter includes a direct current bus and a bus capacitor C1. The direct current bus includes a positive direct current bus and a negative direct current bus. In FIG. 2, the positive direct current bus is identified as P, the negative direct current bus is identified as N, and the bus capacitor C1 is connected in parallel between the positive direct current bus P and the negative direct current bus N.

When determining, by using a first sampling signal for an input voltage of the power supply and a second sampling signal for a voltage of the direct current bus, that an overvoltage exists, the controller 30 performs overvoltage detachment control. The controller 30 may control the first switch unit S1 to be turned off and may control a working status of the controllable switching transistor in the second switch unit S2, so that the second switch unit S2 bypasses the bus capacitor C1.

Due to a feature that the resistance value of the PTC resistor increases step by step when the temperature increases, because the first PTC resistor Rp1 accesses the circuit in this case, a resistance value of the first PTC resistor Rp1 increases rapidly due to heating. In one aspect, the circuit is protected, and in another aspect, a current flowing through the second switch unit S2 is further limited, so that the second switch unit S2 no longer needs to use a relay and can use the controllable switching transistor with a small rated current and low costs.

When the second switch unit S2 is turned on, a voltage of the bus capacitor C1 decreases because the bus capacitor C1 supplies power to a controller of the power conversion circuit. To maintain the voltage of the bus capacitor C1, the controller 30 may control the working status of the controllable switching transistor in the second switch unit S2, so that the bus capacitor C1 is no longer bypassed. In this case, input power performs current-limiting charging on the bus capacitor C1 by using the first PTC resistor Rp1. After charging is completed, the controller 30 controls the working statuses of the controllable switching transistor in the second switch unit S2 again, so that the second switch unit S2 bypasses the bus capacitor C1 again. In this way, voltages at two ends of the bus capacitor C1 maintain in a range, which not only ensures circuit security, and implements surge current suppression and overvoltage protection, but also ensures that the controller of the power conversion circuit can work continuously for a long time.

When determining, by using the first sampling signal for the input voltage of the power supply and the second sampling signal for the voltage of the direct current bus, that no overvoltage exists currently, the controller 30 controls the first switch unit S1 to be turned on, and controls the working status of the controllable switching transistor in the second switch unit S2, so that the bus capacitor C1 is no longer bypassed, and the power converter recovers to normal working.

Figure 3:
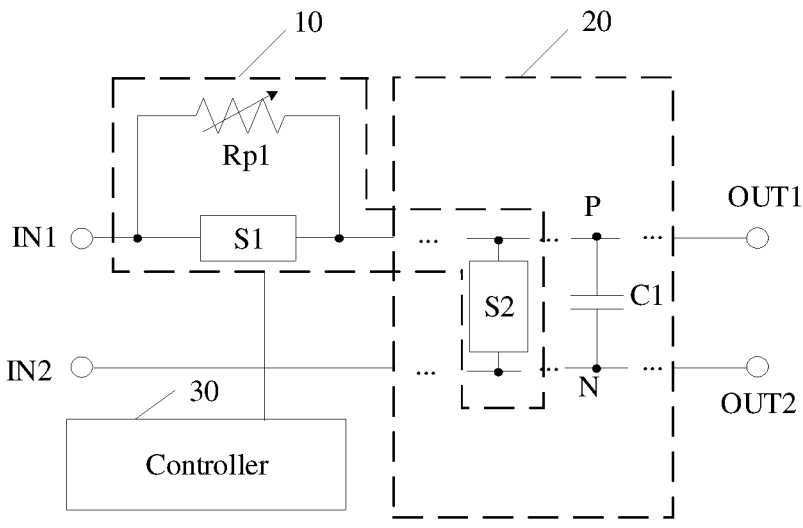
FIG. 3 is a schematic diagram of another power converter according to an embodiment.

FIG. 3 is a schematic diagram of another power converter according to an embodiment.

A difference between the power converter shown in FIG. 3 and that in FIG. 2 lies in that the second switch unit S2 in the protection circuit 10 of the power converter is disposed inside the power conversion circuit and is connected in parallel between two ends of the direct current bus.

In some embodiments, to ensure that the bus capacitor C1 does not discharge electricity rapidly after the second switch unit S2 is turned on, a diode may be further disposed between the bus capacitor C1 and the second switch unit S2, to prevent the bus capacitor C1 and the second switch unit S2 from forming a discharging loop. For example, a diode is connected in series at each of two ends at which the second switch unit S2 and C1 are connected, or a diode is connected in series at one of the two ends.

For a working principle of the protection circuit 10, refer to the foregoing descriptions. Details are not described herein again in this embodiment.

Figure 4:
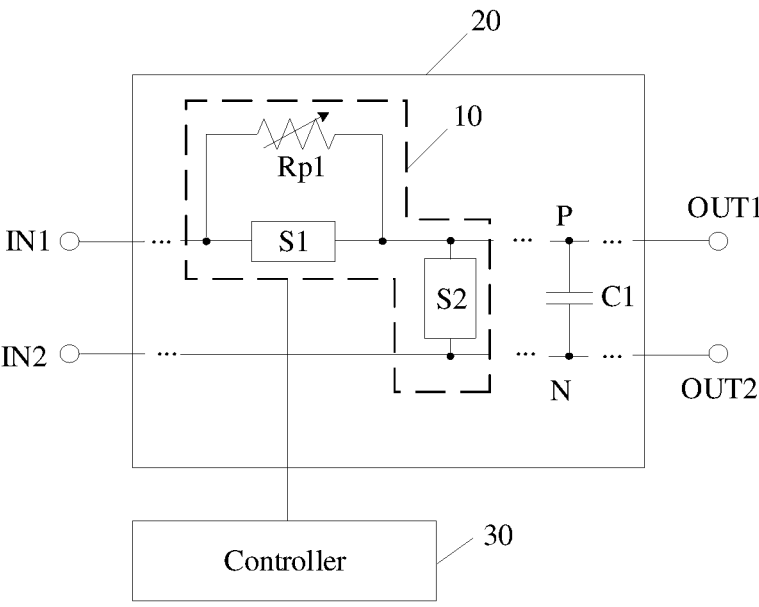
FIG. 4 is a schematic diagram of still another power converter according to an embodiment.

FIG. 4 is a schematic diagram of still another power converter according to an embodiment.

A difference between the power converter shown in FIG. 4 and that in FIG. 2 lies in that the protection circuit 10 of the power converter is disposed inside the power conversion circuit 20. In this case, the first switch unit S1 is connected in series on the direct current bus.

In some embodiments, to ensure that the bus capacitor C1 does not discharge electricity rapidly after the second switch unit S2 is turned on, a diode may be further disposed between the bus capacitor C1 and the second switch unit S2, to prevent the bus capacitor C1 and the second switch unit S2 from forming a discharging loop. For example, a diode is connected in series at each of two ends at which the second switch unit S2 and C1 are connected, or a diode is connected in series at one of the two ends.

For a working principle of the protection circuit 10, refer to the foregoing descriptions. Details are not described herein again in this embodiment.

The power converter in this embodiment may be a DC-DC converter, an AC-DC converter, a DC-AC converter, an AC-DC-AC converter, and the like. This is not limited in this embodiment. Different types of power converters have different power conversion circuits. Details are not completely described herein in this embodiment.

The controller of the power conversion circuit 20 controls a working status of a controllable switching transistor in the power conversion circuit 20, to control the power conversion circuit 20 to implement power conversion. In some embodiments, the controller 30 of the protection circuit 10 and the controller of the power conversion circuit 20 may be separately disposed or may be integrated together. This is not limited in this embodiment. The bus capacitor C1 may further simultaneously supply power to the controller 30 of the protection circuit 10 and the controller of the power conversion circuit 20.

The controller in this embodiment may be an ASIC, a PLD, a DSP, a PLC, an ARM microcontroller, or a combination thereof. The PLD may be a CPLD, an FPGA, a GAL, or any combination thereof. This is not limited in this embodiment.

In addition, the controllable switching transistor in the second switch unit S2 may be an IGBT, an MOSFET, a SiC MOSFET, or the like. This is not limited in this embodiment.

The controller 30 may send a PWM signal or a PFM signal to the controllable switching transistor to control the working status of the controllable switching transistor.

In conclusion, the protection circuit of the power converter uses a feature of a positive temperature coefficient of a PTC resistor to implement an input soft-start requirement, and the PTC resistor does not need to be connected in series to an additional relay, so that a quantity of used relays is decreased, costs of the power converter are reduced, thereby facilitating miniaturization of the power converter. In a long-term overvoltage application scenario, the first switch unit is in a normally open state, and there is no switch loss. The bus capacitor is charged by controlling the working status of the controllable switching transistor with a small rated current, so that the controller of the power converter can normally obtain power. A speed of turning on/off the controllable switching transistor is large, and control reliability is high, thereby preventing adhesion and sparking from occurring in a relay to affect reliability. Therefore, reliability of the power converter is further improved.

Figure 5:
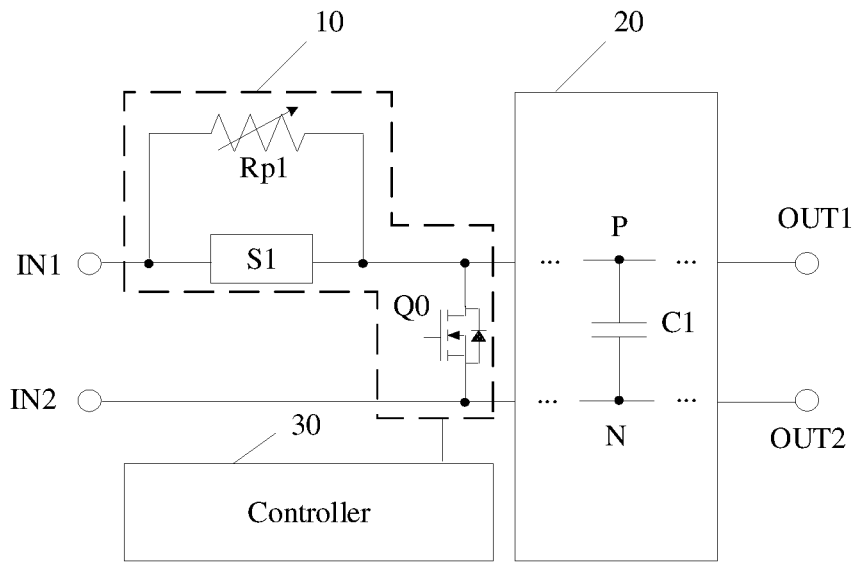
FIG. 5 is a schematic diagram obtained when a second switch unit corresponding to FIG. 2 includes an independently disposed controllable switching transistor.

FIG. 5 is a schematic diagram obtained when a second switch unit corresponding to FIG. 2 includes an independently disposed controllable switching transistor.

The controllable switching transistor included in the second switch unit S2 in this embodiment may be a switching transistor disposed independent of the power conversion circuit. In the figure, an example in which the second switch unit S2 includes one controllable switching transistor Q0 is used. In some other embodiments, the second switch unit S2 may further include a plurality of controllable switching transistors connected in parallel, to enhance a current withstanding capability of the second switch unit S2 and provide redundancy protection.

In some embodiments, to ensure that the bus capacitor C1 does not discharge electricity rapidly after Q0 is turned on, a diode may be further disposed between the bus capacitor C1 and Q0, to prevent the bus capacitor C1 and Q0 from forming a discharging loop. For example, a diode is connected in series at each of two ends at which Q0 and C1 are connected, or a diode is connected in series at one of the two ends.

Implementations of the second switch units of the power converters shown in FIG. 3 and FIG. 4 are similar to this, and details are not described herein again.

In actual application, because the power conversion circuit 20 includes the controllable switching transistor, the controllable switching transistor in the second switch unit S2 may multiplex the controllable switching transistor in the power conversion circuit 20, to reduce costs and save space. The following provides description with reference to an implementation of the power converter.

The following first describes an implementation and a working principle that are used when the power converter is an AC-DC converter (rectifier).

Figure 6:
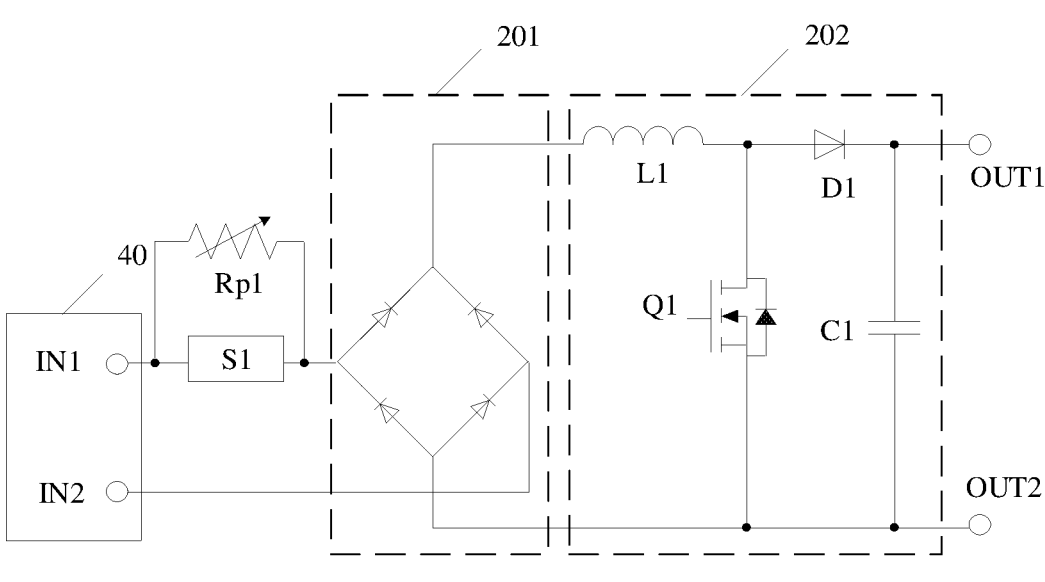
FIG. 6 is a schematic diagram of an AC-DC converter according to an embodiment.

FIG. 6 is a schematic diagram of an AC-DC converter according to an embodiment.

A topology structure of a power conversion circuit of the AC-DC converter shown in the figure is a boost type bridged PFC circuit, and an input end 40 of the power converter is connected to a single-phase alternating current. An output end of the power converter outputs a direct current.

The power conversion circuit is configured to convert an alternating current into a direct current that meets a voltage condition and then output the direct current.

The power conversion circuit of the power converter includes a full-bridge rectifier circuit 201 and a boost circuit 202.

The boost circuit 202 may include a first inductor L1, a first diode D1, a first switching transistor Q1, and the bus capacitor C1.

The first switch unit S1 is connected between the input end 40 and an input end of the full-bridge rectifier circuit 201.

A first output end of the full-bridge rectifier circuit 201 is connected to a first end of the first inductor L1, and a second end of the first inductor L1 is connected to a second output end of the full-bridge rectifier circuit 201 by using the first switching transistor Q1.

The second end of the first inductor L1 is connected to an anode of the first diode D1, a cathode of the first diode D1 is connected to a first end of the bus capacitor C1, and the second output end of the full-bridge rectifier circuit 201 is connected to a second end of the bus capacitor C1.

The second switch unit multiplexes the first switching transistor Q1 in the boost circuit 202.

The following describes a principle of implementing surge current suppression and overvoltage protection by the protection circuit.

Figure 7:
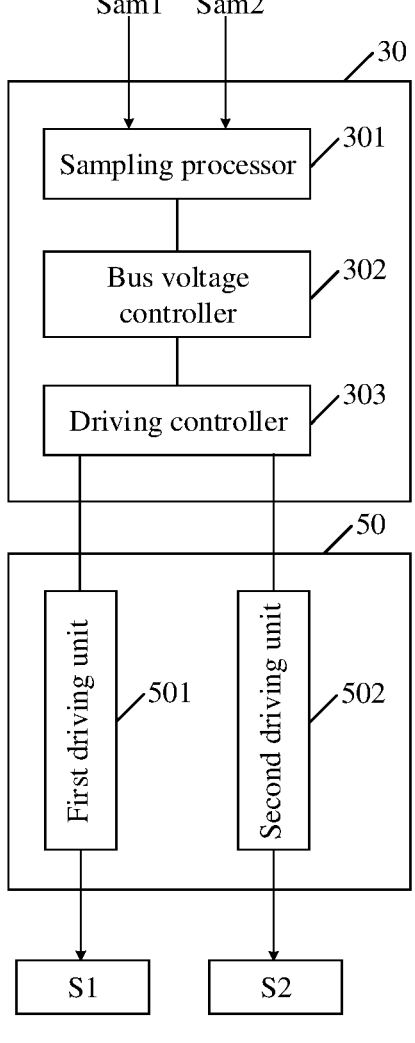
FIG. 7 is a schematic diagram of a control circuit according to an embodiment.

FIG. 7 is a schematic diagram of a control circuit according to an embodiment.

The controller 30 may include a sampling processor 301, a bus voltage controller 302, and a driving controller 303.

The sampling processor 301 is configured to process a first sampling signal Sam1 for the input voltage of the power supply and a second sampling signal Sam2 for the voltage of the direct current bus, to convert the first sampling signal Sam1 and the second sampling signal Sam2 into a voltage signal that can be identified by the controller 30.

The bus voltage controller 302 is configured to determine a current working status of the power converter by using the voltage signal obtained through processing, determine an output status of a driving signal based on the working status, and notify the driving controller 303 of the output status.

The driving controller 303 converts the obtained driving signal and then transmits the converted driving signal to a driving circuit 50, so that the driving circuit 50 changes working statuses of the first switch unit and the second switch unit.

The driving circuit 50 is configured to change the working statuses of the first switch unit S1 and the second switch unit S2 under control of the controller 30.

The driving circuit 50 may include a first driving unit 501 configured to drive the first switch unit S1, and a second driving unit 502 configured to drive the second switch unit S2.

In some embodiments, the first switch unit S1 is a relay. In this case, the first driving unit 501 is a relay driving unit.

In some other embodiments, the first switch unit S1 includes a controllable switching transistor and a relay that are connected in parallel. In this case, the first driving unit 501 includes a relay driving unit and a switching transistor driving unit.

The second switch unit S2 includes a controllable switching transistor. In this case, the second driving unit 502 is a switching transistor driving unit.

Still referring to FIG. 6, after the AC-DC converter is connected to an alternating current input, the controller 30 controls the first switch unit S1 to be in an off state, and the input current performs current-limiting charging on the bus capacitor C1 after passing through the first PTC resistor Rp1, the full-bridge rectifier circuit 201, the first inductor L1, and the first diode D1. A bus charging current gradually decreases as voltages at two ends of the bus capacitor increase, and resistance of the first PTC resistor Rp1 increases due to heating caused by the current flowing through the first PTC resistor Rp1, which suppresses the bus charging current, thereby suppressing a surge current.

When an overvoltage occurs in the alternating current input in a working process of the power converter, an overvoltage occurs in the direct current bus after the alternating current input passes through the full-bridge rectifier circuit, and a component in the power conversion circuit is prone to be damaged. In addition, an internal fault of the power converter or a wiring error may also cause an overvoltage on the direct current bus. The controller 30 determines, by using the first sampling signal for the input voltage of the power supply and the second sampling signal for the voltage of the direct current bus, whether an overvoltage exists.

In some embodiments, when determining, by using the first sampling signal, that the voltage of the external power supply is greater than a first voltage threshold V1, or when determining, by using the second sampling signal, that the voltage of the direct current bus is greater than a second voltage threshold V2, the controller 30 determines that an overvoltage exists. In this case, overvoltage determining of the controller has high sensitivity, and subsequent overvoltage detachment control can be performed in time.

In some other embodiments, when determining, by using the first sampling signal, that the voltage of the external power supply is greater than the first voltage threshold V1, and determining, by using the second sampling signal, that the voltage of the direct current bus is greater than the second voltage threshold V2, the controller 30 determines that an overvoltage exists. In this case, overvoltage determining of the controller 30 has a degree of fault tolerance, and frequent overvoltage detachment control can be avoided.

The controller 30 may determine a current working status of the power converter by using the obtained first sampling signal and second sampling signal and a preset working status determining table.

The working status determining table may be determined and stored in a memory in advance, and the controller 30 reads the working status determining table from the memory. The memory may be a non-volatile memory (NVM), for example, a read-only memory (ROM), and may be an electrically erasable programmable read-only memory (EE- ROM), an erasable programmable read-only memory (EPROM), or the like. This is not limited in this embodiment.

When determining that an overvoltage fault exists, the controller 30 performs overvoltage detachment control, and the controller 30 controls the first switch unit S1 to be turned off and controls Q1 to be turned on. In this case, the alternating-current input current passes through the first PTC resistor Rp1, the full-bridge rectifier circuit 201, the first inductor L1, the first switching transistor Q1 (that is, the second switch unit S2), and the full-bridge rectifier circuit 201. The bus capacitor C1 is bypassed, and a resistance value of the first PTC resistor Rp1 increases rapidly due to heating. In one aspect, the circuit is protected, and in another aspect, a current flowing through the first switching transistor Q1 is further limited.

The voltages at the two ends of the bus capacitor C1 gradually decrease because the bus capacitor C1 supplies power to other parts of the circuit. When determining, by using the second sampling signal, that the voltage of the direct current bus is less than a third voltage threshold V3, the controller 30 controls the first switching transistor Q1 to be turned off.

After Q1 is turned off, the alternating-current input current charges the bus capacitor C1 after passing through the first PTC resistor Rp1, the full-bridge rectifier circuit 201, the first inductor L1, and the first diode D1. The voltages at the two ends of the bus capacitor C1 gradually increase. When determining, by using the second sampling signal, that the voltage of the direct current bus increases to exceed a fourth voltage threshold V4, the controller 30 determines that charging of the bus capacitor C1 is completed and controls the first switching transistor Q1 to be turned on to stop charging the bus capacitor C1.

The third voltage threshold V3 is less than the fourth voltage threshold V4, and the fourth voltage threshold V4 is less than or equal to the second voltage threshold V2. In a preferred implementation, the fourth voltage threshold V4 is less than the second voltage threshold V2.

Through the foregoing control performed by the controller 30, the voltages at the two ends of the bus capacitor C1 maintain between the third voltage threshold V3 and the fourth voltage threshold V4, to ensure that the bus capacitor C1 can always supply power normally in a long-term overvoltage condition, for example, supply power to the controller of the power conversion circuit.

After determining that the overvoltage fault is cleared, the controller 30 controls the first switch unit S1 to be turned on, to bypass the first PTC resistor Rp1, so that the power conversion circuit can work normally.

In some embodiments, the controller 30 may be integrated with the controller of the power conversion circuit, that is, the controller may further control a working status of the power conversion circuit.

Figure 8:
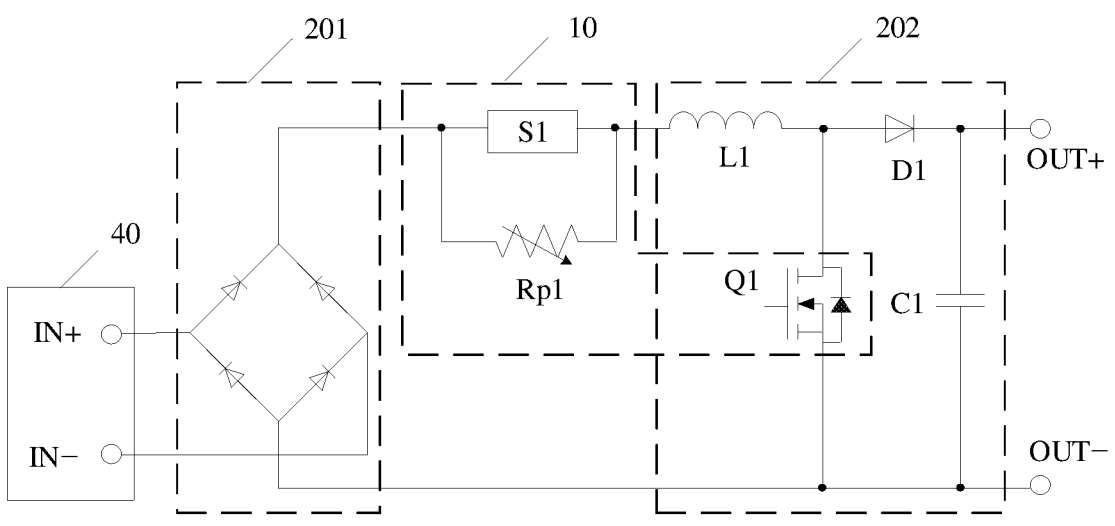
FIG. 8 is a schematic diagram of another AC-DC converter according to an embodiment.

FIG. 8 is a schematic diagram of another AC-DC converter according to an embodiment.

A difference between the AC-DC converter shown in FIG. 8 and that in FIG. 7 lies in the following: The first switch unit S1 in FIG. 7 is located between the power supply and the full-bridge rectifier circuit 201, and the first switch unit S1 in FIG. 8 is located between the full-bridge rectifier circuit 201 and the boost circuit 202.

For working principles of the protection circuit 10 and the controller 30, refer to the foregoing descriptions. Details are not described herein again.

In conclusion, the power converter provided in this embodiment is the AC-DC converter. The protection circuit of the power converter uses a feature of a positive temperature coefficient of a PTC resistor to implement an input soft-start requirement. The PTC resistor does not need to be connected in series to an additional relay, and the controllable switching transistor in the power conversion circuit is multiplexed. Compared with the conventional technology, a quantity of used relays is decreased, and costs of the power converter are reduced, thereby facilitating miniaturization of the power converter. In addition, the first PTC resistor may further limit a current flowing through the second switch unit. In a long-term overvoltage condition, the first switch unit is in a normally open state, and does not frequently switch a working status, thereby prolonging a service periodicity of the first switch unit. The bus capacitor is charged by controlling the working status of the controllable switching transistor, so that the controller of the power converter can normally obtain power. Compared with the conventional technology, adhesion and sparking caused by use of a relay are avoided, thereby improving reliability of the power converter.

The following describes another implementation and working principle that are used when the power converter is an AC-DC converter (rectifier). A topology structure of a power conversion circuit of the AC-DC converter is an interleaved parallel type bridged PFC circuit.

Figure 9:
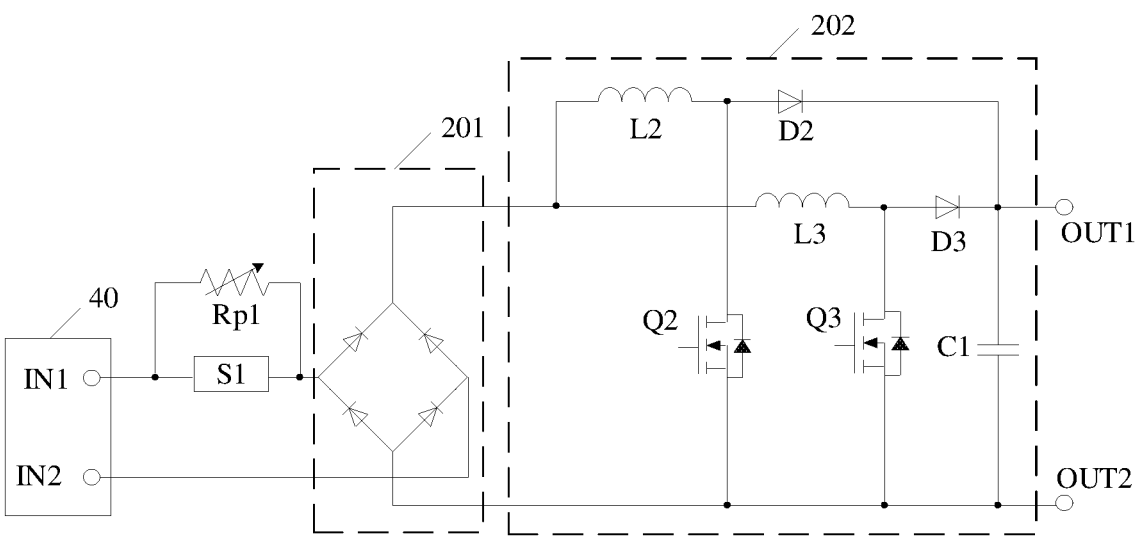
FIG. 9 is a schematic diagram of still another AC-DC converter according to an embodiment.

FIG. 9 is a schematic diagram of still another AC-DC converter according to an embodiment.

The power conversion circuit of the AC-DC converter includes a full-bridge rectifier circuit 201 and a boost circuit 202.

The boost circuit 202 includes a second inductor L2, a third inductor L3, a second diode D2, a third diode D3, a second switching transistor Q2, a third switching transistor Q3, and the bus capacitor C1.

A first output end of the full-bridge rectifier circuit 201 is connected to a first end of the second inductor L2 and a first end of the third inductor L3, a second end of the second inductor L2 is connected to a second output end of the full-bridge rectifier circuit 201 by using the second switching transistor Q2, and a second end of the third inductor L3 is connected to the second output end of the full-bridge rectifier circuit by using the third switching transistor Q3.

The second end of the second inductor L2 is connected to an anode of the second switching transistor D2, a cathode of the second diode D2 is connected to a first end of the bus capacitor C1, the second end of the third inductor L3 is connected to an anode of the third diode D3, a cathode of the third diode D3 is connected to the first end of the bus capacitor C1, and the second output end of the full-bridge rectifier circuit 201 is connected to a second end of the bus capacitor C1.

The second switch unit multiplexes the second switching transistor Q2 and the third switching transistor Q3 in the boost circuit 202.

A principle of performing surge current suppression and overvoltage protection by the protection circuit is similar to that in the embodiment corresponding to FIG. 6, and a difference lies in the following.

When determining that an overvoltage fault exists, the controller 30 performs overvoltage detachment control, and the controller 30 controls the first switch unit S1 to be turned off and controls both Q2 and Q3 to be turned on. In this case, after an alternating-current input current passes through the first PTC resistor Rp1 and the full-bridge rectifier circuit 201, a part of the current returns to the full-bridge rectifier circuit 201 after passing through the second inductor L2 and the second switching transistor Q2, and the other part of the current returns to the full-bridge rectifier circuit 201 after passing through the third inductor L3 and the third switching transistor Q3. Therefore, the bus capacitor C1 is bypassed, and a resistance value of the first PTC resistor Rp1 increases rapidly due to heating. In one aspect, the circuit is protected, and in another aspect, a current flowing through Q2 and Q3 is further limited.

When determining, by using the second sampling signal, that the voltage of the direct current bus is less than a third voltage threshold V3, the controller 30 controls both the second switching transistor Q2 and the third switching transistor Q3 to be turned off, or controls the second switching transistor Q2 and the third switching transistor Q3 to be alternately turned on.

In this case, the alternating current input charges the bus capacitor C1, and voltages at two ends of the bus capacitor C1 gradually increase. When determining, by using the second sampling signal, that the voltage of the direct current bus increases to exceed a fourth voltage threshold V4, the controller 30 determines that charging of the bus capacitor C1 is completed, and further controls both the second switching transistor Q2 and the third switching transistor Q3 to be turned on to stop charging the bus capacitor C1.

Figures 10, 11:
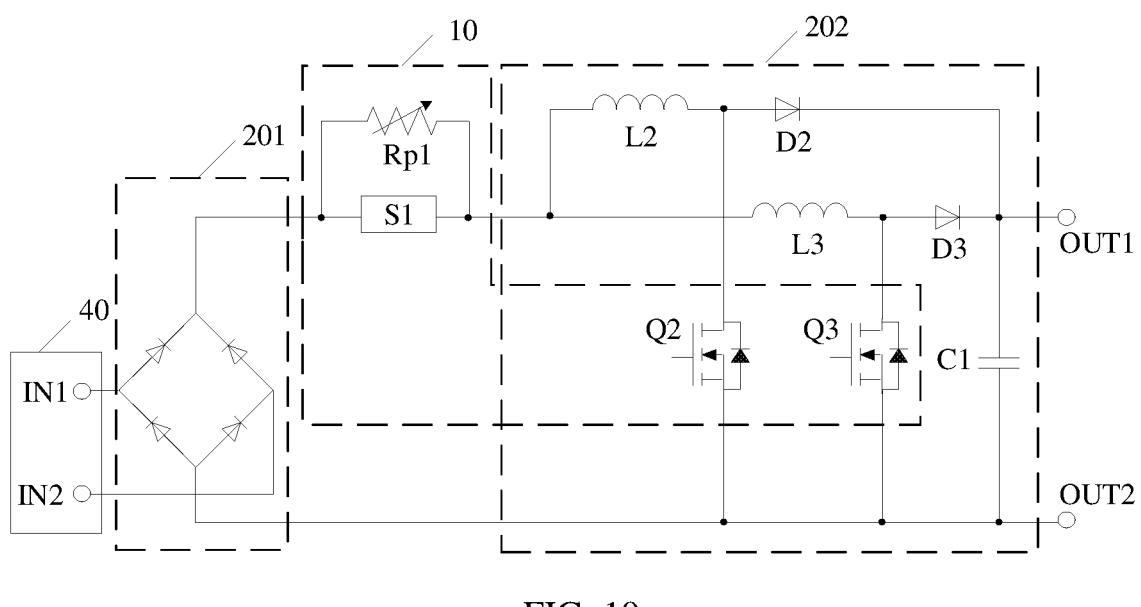
FIG. 10 is a schematic diagram of yet another AC-DC converter according to an embodiment.
FIG. 11 is a schematic diagram of another AC-DC converter according to an embodiment.

FIG. 10 is a schematic diagram of still another AC-DC converter according to an embodiment.

A difference between the AC-DC converter shown in FIG. 10 and that in FIG. 9 lies in the following: The first switch unit S1 in FIG. 9 is located between the power supply and the full-bridge rectifier circuit 201, and the first switch unit S1 in FIG. 10 is located between the full-bridge rectifier circuit 201 and the boost circuit 202.

For working principles of the protection circuit 10 and the controller 30, refer to the foregoing descriptions. Details are not described herein again.

Referring to the AC-DC converters shown in FIG. 9 and FIG. 10, in another possible implementation, the second switch unit may alternatively multiplex only the second switching transistor Q2 in the boost circuit 202. When it is determined that an overvoltage exists, Q3 is always turned off, and the controller controls Q2 to switch between an on state and an off state to perform current-limiting charging on the bus capacitor C1 and maintain the voltages at the two ends of the bus capacitor C1 in a proper range.

In still another possible implementation, the second switch unit may alternatively multiplex only the third switching transistor Q3 in the boost circuit 202. When it is determined that an overvoltage exists, Q2 is always turned off, and the controller controls Q3 to switch between an on state and an off state to perform current-limiting charging on the bus capacitor C1 and maintain the voltages at the two ends of the bus capacitor C1 in a proper range.

In some embodiments, the controller 30 can further control a working status of the power conversion circuit. A manner of controlling the power conversion circuit by the controller 30 includes but is not limited to duty cycle conversion control, frequency conversion control, phase shift control, and the like. This is not limited in this embodiment.

In conclusion, the power converter provided in this embodiment is the AC-DC converter. The protection circuit of the power converter uses a feature of a positive temperature coefficient of a PTC resistor to implement an input soft-start requirement. The PTC resistor does not need to be connected in series to an additional relay, and the controllable switching transistor in the power conversion circuit is multiplexed, so that a quantity of used relays is decreased, and costs of the power converter are reduced, thereby facilitating miniaturization of the power converter. In addition, the first PTC resistor may further limit a current flowing through the second switch unit. In a long-term overvoltage condition, the first switch unit is in a normally open state, and does not frequently switch a working status, thereby prolonging a service life of the first switch unit. The bus capacitor is charged by controlling the working status of the controllable switching transistor, so that the controller of the power converter can normally obtain power, thereby avoiding adhesion and sparking caused by use of a relay and improving reliability of the power converter.

The following describes still another implementation and working principle that are used when the power converter is an AC-DC converter (rectifier). A topology structure of a power conversion circuit of the AC-DC converter is a bridgeless boost type PFC circuit.

FIG. 11 is a schematic diagram of another AC-DC converter according to an embodiment.

A power conversion circuit 202 of the AC-DC converter is a boost circuit, including a fourth inductor L4, a fourth switching transistor Q4, a fifth switching transistor Q5, a fourth diode D4, a fifth diode D5, and the bus capacitor C1.

A first end of the fourth inductor L4 is connected to a first end IN1 of the power supply by using the first PTC resistor Rp1, a second end of the fourth inductor L4 is connected to a first end of the bus capacitor C1 by using the fourth switching transistor Q4, and the second end of the fourth inductor L2 is connected to a second end of the bus capacitor C1 by using the fifth switching transistor Q5. An anode of the fourth diode D4 is connected to a cathode of the fifth diode and a second end IN2 of the power supply, a cathode of the fourth diode D4 is connected to the first end of the bus capacitor C1, and an anode of the fifth diode D5 is connected to the second end of the bus capacitor C1.

The second switch unit includes the fourth switching transistor Q4 and the fifth switching transistor Q5.

The following describes a principle of implementing surge current suppression and overvoltage protection by the protection circuit.

When determining that an overvoltage fault exists, the controller 30 performs overvoltage detachment control. The controller 30 controls the first switch unit S1 to be turned off, and when a voltage at the first end IN1 of the power supply is greater than a voltage at the second end IN2 of the power supply, controls Q4 to be turned off and controls Q5 to be turned on. In this case, an alternating current input passes through the first PTC resistor Rp1, the fourth inductor L4, Q5, and D5. When the voltage at the first end IN1 of the power supply is less than or equal to the voltage at the second end IN2 of the power supply, the controller 30 controls Q4 to be turned on and controls Q5 to be turned off. In this case, the alternating current input passes through D4, Q4, the fourth inductor L4, and the first PTC resistor Rp1, and the bus capacitor C1 is bypassed by controlling Q4 and Q5.

In a process of alternately turning on Q1 and Q2, impedance of the first PTC resistor Rp1 increases rapidly due to heating. In one aspect, the circuit is protected, and in another aspect, a current flowing through Q4 and Q5 is further limited.

Voltages at two ends of the bus capacitor C1 gradually decrease because the bus capacitor C1 supplies power to other parts of the circuit. The controller 30 controls working statuses of Q4 and Q5 to charge the bus capacitor C1.

In a possible implementation, when determining that the voltage of the direct current bus is less than a third voltage threshold, if the voltage at the first end IN1 of the power supply is greater than the voltage at the second end IN2 of the power supply, the alternating current input charges the bus capacitor C1 by using the fourth inductor L4 and Q4. If the voltage at the first end IN1 of the power supply is less than or equal to the voltage at the second end IN2 of the power supply, the alternating current input charges the bus capacitor C1 by using D4. When determining that the voltage of the direct current bus is greater than or equal to a fourth voltage threshold, the controller 30 recovers the foregoing overvoltage detachment control.

In another possible implementation, antiparallel body diodes of Q4 and Q5 may be used to perform freewheeling. In this case, when the voltage at the first end IN1 of the power supply is greater than the voltage at the second end IN2 of the power supply, the alternating current input passes through the first PTC resistor Rp1, the fourth inductor L4, and the body diode of Q4 to charge the bus capacitor C1. When the voltage at the first end IN1 of the power supply is less than or equal to the voltage at the second end IN2 of the power supply, the alternating current input passes through D4, C1, and the body diode of Q5, the fourth inductor L4, and the first PTC resistor Rp1 to charge the bus capacitor C1.

In conclusion, the power converter provided in this embodiment is the AC-DC converter. The protection circuit of the power converter uses a feature of a positive temperature coefficient of a PTC resistor to implement an input soft-start requirement. The PTC resistor does not need to be connected in series to an additional relay, and the controllable switching transistor in the power conversion circuit is multiplexed, so that a quantity of used relays is decreased, and costs of the power converter are reduced, thereby facilitating miniaturization of the power converter. The first PTC resistor may further limit a current flowing through the second switch unit. In a long-term overvoltage condition, the first switch unit is in a normally open state, and does not frequently switch a working status, thereby prolonging a service periodicity of the first switch unit. The bus capacitor is charged by controlling the working status of the controllable switching transistor, so that the controller of the power converter can normally obtain power, thereby avoiding adhesion and sparking caused by use of a relay and improving reliability of the power converter.

The following describes an implementation and a working principle that are used when the power converter is a DC-DC converter.

An input end of the DC-DC converter is connected to a direct current power supply and outputs a direct current. In some embodiments, the input end of the DC-DC converter may be connected to a battery pack. A power conversion circuit of the DC-DC converter may be a boost circuit, a buck circuit, a buck-boost circuit, a full-bridge circuit, a forward conversion circuit, a phase-shift full-bridge conversion circuit, an LLC (L represents an inductor, and C represents a capacitor) resonant conversion circuit, or the like. This is not limited in this embodiment. The following is described by using an example in which the power conversion circuit is a boost circuit. Principles of other types of power conversion circuits are similar to this and are not described in detail one by one in this embodiment.

Figure 12:
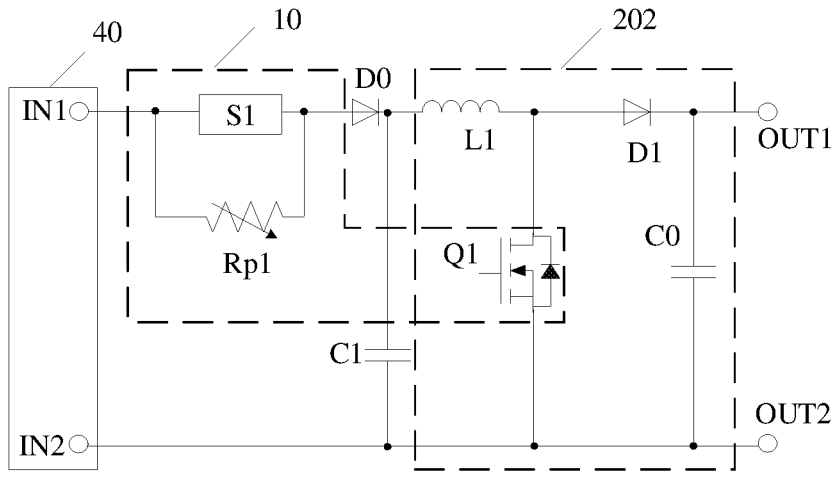
FIG. 12 is a schematic diagram of a DC-DC converter according to an embodiment.

FIG. 12 is a schematic diagram of a DC-DC converter according to an embodiment.

A power conversion circuit 202 of the DC-DC converter is a boost circuit, including a first inductor L1, a first diode D1, a first switching transistor Q1, and an output end capacitor C0.

The bus capacitor C1 of the DC-DC converter is connected between a positive direct current bus and a negative direct current bus of an input end of the power conversion circuit 202.

A first input end IN1 is connected to a first end of the first inductor L1 by using the first switch unit S1 and a diode D0, a second end of the first inductor L1 is connected to a second input end IN2 by using the first switching transistor Q1, the second end of the first inductor L1 is connected to an anode of the first diode D1, a cathode of the first diode D1 is connected to a first end of the bus capacitor C1, and the second input end IN2 is connected to a second end of the bus capacitor C1.

The diode D0 is configured to block a reverse current in the circuit.

The second switch unit is the first switching transistor Q1.

The following describes a principle of implementing surge current suppression and overvoltage protection by the protection circuit 10.

After the DC-DC converter is connected to a direct current input, the controller 30 controls the first switch unit S1 to be in an off state, and the input current performs current-limiting charging on the bus capacitor C1 after passing through the first PTC resistor Rp1, the diode D0, the first inductor L1, and the first diode D1. A bus charging current gradually decreases as voltages at two ends of the bus capacitor C1 increase, and resistance of the first PTC resistor Rp1 increases due to heating caused by the current flowing through the first PTC resistor Rp1, which suppresses the bus charging current, thereby suppressing a surge current.

In some embodiments, when determining, by using the first sampling signal, that the voltage of the external power supply is greater than a first voltage threshold V1, or when determining, by using the second sampling signal, that the voltage of the direct current bus is greater than a second voltage threshold V2, the controller 30 determines that an overvoltage exists. In this case, overvoltage determining of the controller has high sensitivity, and subsequent overvoltage detachment control can be performed in time.

In some other embodiments, when determining, by using the first sampling signal, that the voltage of the external power supply is greater than the first voltage threshold V1, and determining, by using the second sampling signal, that the voltage of the direct current bus is greater than the second voltage threshold V2, the controller 30 determines that an overvoltage exists. In this case, overvoltage determining of the controller 30 has a degree of fault tolerance, and frequent overvoltage detachment control can be avoided.

The controller 30 may determine a current working status of the power converter by using the obtained first sampling signal and second sampling signal and a preset working status determining table.

The working status determining table may be determined and stored in a memory in advance, and the controller 30 reads the working status determining table from the memory.

When determining that an overvoltage fault exists, the controller 30 performs overvoltage detachment control, and the controller 30 controls the first switch unit S1 to be turned off and controls Q1 to be turned on. In this case, an alternating-current input current passes through the first PTC resistor Rp1, the diode D0, the first inductor L1, and the first switching transistor Q1. The bus capacitor C1 is bypassed, and a resistance value of the first PTC resistor Rp1 increases rapidly due to heating. In one aspect, the circuit is protected, and in another aspect, a current flowing through the first switching transistor Q1 is further limited.

The voltages at the two ends of the bus capacitor C1 gradually decrease because the bus capacitor C1 supplies power to other parts of the circuit. When determining, by using the second sampling signal, that the voltage of the direct current bus is less than a third voltage threshold V3, the controller 30 controls the first switching transistor Q1 to be turned off.

After Q1 is turned off, the alternating-current input current charges the bus capacitor C1 after passing through the first PTC resistor Rp1, the diode D0, the first inductor L1, and the first diode D1. The voltages at the two ends of the bus capacitor C1 gradually increase. When determining, by using the second sampling signal, that the voltage of the direct current bus increases to exceed a fourth voltage threshold V4, the controller 30 determines that charging of the bus capacitor C1 is completed and controls the first switching transistor Q1 to be turned on to stop charging the bus capacitor C1.

The third voltage threshold V3 is less than the fourth voltage threshold V4, and the fourth voltage threshold V4 is less than or equal to the second voltage threshold V2. In a preferred implementation, the fourth voltage threshold V4 is less than the second voltage threshold V2.

Through the foregoing control performed by the controller 30, the voltages at the two ends of the bus capacitor C1 maintain between the third voltage threshold V3 and the fourth voltage threshold V4, to ensure that the bus capacitor C1 can always supply power normally in a long-term overvoltage condition, for example, supply power to the controller of the power conversion circuit. After determining that the overvoltage fault is cleared, the controller 30 controls the first switch unit S1 to be turned on, to bypass the first PTC resistor Rp1, so that the power conversion circuit can work normally.

In conclusion, the power converter provided in this embodiment is the DC-DC converter. The protection circuit of the power converter uses a feature of a positive temperature coefficient of a PTC resistor to implement an input soft-start requirement. The PTC resistor does not need to be connected in series to an additional relay, and the controllable switching transistor in the power conversion circuit is multiplexed, so that a quantity of used relays is decreased, and costs of the power converter are reduced, thereby facilitating miniaturization of the power converter. In a long-term overvoltage condition, the first switch unit is in a normally open state, and does not frequently switch a working status, thereby prolonging a service periodicity of the first switch unit. The bus capacitor is charged by controlling the working status of the controllable switching transistor, so that the controller of the power converter can normally obtain power, thereby avoiding adhesion and sparking caused by use of a relay and improving reliability of the power converter.

The following describes an implementation and a working principle that are used when the power converter is a DC-AC converter.

An input end of the DC-AC converter is connected to a direct current power supply and outputs an alternating current. In some embodiments, the input end of the DC-AC converter may be connected to a battery pack. A power conversion circuit of the DC-AC converter may also be referred to as an inverse conversion circuit. An implementation of the inverse conversion circuit is a mature conventional technology, and details are not described herein in this embodiment.

Figure 13:
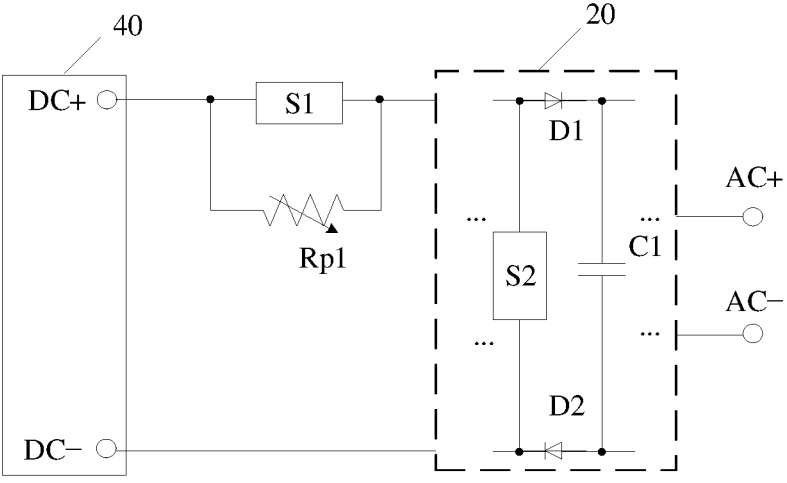
FIG. 13 is a schematic diagram of a DC-AC converter according to an embodiment.

FIG. 13 is a schematic diagram of a DC-AC converter according to an embodiment.

An input end 40 of the DC-AC converter is connected to a direct current, and a power conversion circuit 20 is a DC-AC conversion circuit.

After the DC-AC converter is connected to an alternating current input, the controller 30 controls the first switch unit S1 to be in an off state, and the input current performs current-limiting charging on the bus capacitor C1 after passing through the first PTC resistor Rp1. A bus charging current gradually decreases as voltages at two ends of the bus capacitor increase, and resistance of the first PTC resistor Rp1 increases due to heating caused by the current flowing through the first PTC resistor Rp1, which suppresses the bus charging current, thereby suppressing a surge current.

The controller 30 may determine a current working status of the power converter by using the obtained first sampling signal and second sampling signal and a preset working status determining table.

When determining that an overvoltage fault exists, the controller 30 performs overvoltage detachment control. The controller 30 controls the first switch unit S1 to be turned off and controls a working status of the controllable switching transistor of the second switch unit S2 to stop charging the bus capacitor C1.

The voltages at the two ends of the bus capacitor C1 gradually decrease because the bus capacitor C1 supplies power to other parts of the circuit. When determining, by using the second sampling signal, that the voltage of the direct current bus is less than a third voltage threshold V3, the controller 30 controls the working status of the controllable switching transistor of the second switch unit S2 to charge the bus capacitor C1. The voltages at the two ends of the bus capacitor C1 gradually increase. When determining, by using the second sampling signal, that the voltage of the direct current bus increases to exceed a fourth voltage threshold V4, the controller 30 determines that charging of the bus capacitor C1 is completed and controls the working status of the controllable switching transistor of the second switch unit S2 to stop charging the bus capacitor C1.

To ensure that the bus capacitor C1 does not discharge electricity rapidly after the second switch unit S2 is turned on, a diode may be further disposed between the bus capacitor C1 and the second switch unit S2, to prevent the bus capacitor C1 and the second switch unit S2 from forming a discharging loop. For example, a diode is connected in series at each of two ends at which the second switch unit S2 and C1 are connected, or a diode is connected in series at one of the two ends, that is, either of D1 and D2 shown in the figure may be disposed, or both D1 and D2 may be disposed.

The third voltage threshold V3 is less than the fourth voltage threshold V4, and the fourth voltage threshold V4 is less than or equal to a second voltage threshold V2. In a preferred implementation, the fourth voltage threshold V4 is less than the second voltage threshold V2.

Through the foregoing control performed by the controller 30, the voltages at the two ends of the bus capacitor C1 maintain between the third voltage threshold V3 and the fourth voltage threshold V4, to ensure that the bus capacitor C1 can always supply power normally in a long-term overvoltage condition, for example, supply power to the controller of the power conversion circuit.

After determining that the overvoltage fault is cleared, the controller 30 controls the first switch unit S1 to be turned on, to bypass the first PTC resistor Rp1, so that the power conversion circuit can work normally.

In some embodiments, the controller 30 may be integrated with the controller of the power conversion circuit, that is, the controller may further control a working status of the power conversion circuit.

In conclusion, the power converter provided in this embodiment is the DC-AC converter. The protection circuit of the power converter uses a feature of a positive temperature coefficient of a PTC resistor to implement an input soft-start requirement. The PTC resistor does not need to be connected in series to an additional relay, and the controllable switching transistor in the power conversion circuit is multiplexed, so that a quantity of used relays is decreased, and costs of the power converter are reduced, thereby facilitating miniaturization of the power converter. In a long-term overvoltage condition, the first switch unit is in a normally open state, and does not frequently switch a working status, thereby prolonging a service periodicity of the first switch unit. The bus capacitor is charged by controlling the working status of the controllable switching transistor, so that the controller of the power converter can normally obtain power, thereby avoiding adhesion and sparking caused by use of a relay and improving reliability of the power converter.

The following describes an implementation and a working principle that are used when the power converter is an AC-DC-AC converter.

FIG. 14 is a schematic diagram of an AC-DC-AC converter according to an embodiment.

The AC-DC-AC converter may implement bidirectional alternating current input and alternating current output. An input side 40 may be connected to an alternating current power supply, and an alternating current is output from an output side 40b after frequency conversion and voltage adjustment. In addition, the output side 40b may also be used as an input side 40. The output side 40b may be connected to an alternating current power supply, and an alternating current is output from the input side 40 after frequency conversion and voltage adjustment, to implement reverse flow of energy.

The following uses an example in which the input side 40 is connected to an alternating current power supply and the output side 40b outputs an alternating current power supply to describe a principle of implementing surge current suppression and overvoltage protection by the protection circuit.

A power conversion circuit of the AC-DC-AC converter includes a rectifier circuit, a direct current bus, and an inverse conversion circuit. This embodiment is described by using an example in which the rectifier circuit is a full-bridge rectifier circuit 203 and the inverse conversion circuit is a full-bridge inverse conversion circuit 204. A principle used when the rectifier circuit and the inverse conversion circuit are implemented in another manner is similar to this. Details are not described herein again in this embodiment.

A difference between the full-bridge rectifier circuit 203 in FIG. 14 and the full-bridge rectifier circuit 201 in FIG. 6, FIG. 8, FIG. 9, and FIG. 10 lies in that the full-bridge rectifier circuit 203 in FIG. 14 uses controllable switching transistors.

In this case, a protection circuit is disposed on both the input side and the output side of the AC-DC-AC converter, that is, in addition to the first switch unit S1, the second switch unit S2, and the first PTC resistor Rp1, the protection circuit further includes a second PTC resistor Rp2, a third switch unit S3, and a fourth switch unit S4. The second switch unit S2 includes controllable switching transistors Q6 to Q9 in the full-bridge rectifier circuit. The fourth switch unit S4 includes controllable switching transistors Q10 to Q13 in the full-bridge inverse conversion circuit.

The second PTC resistor Rp2 is connected in series between a first output end of the inverse conversion circuit 204 and a first output end OUT1 of the power converter, and the third switch unit S3 is connected in parallel to the second PTC resistor Rp2.

The protection circuits on the two sides are controlled by a same controller.

The following uses an example in which an output end of the AC-DC-AC converter is connected to an alternating current load to describe a principle of implementing surge current suppression and overvoltage protection by the protection circuit.

After the AC-DC-AC converter is connected to an alternating current input, the controller controls the first switch unit S1 to be in an off state and controls all of Q10 to Q13 to be turned off, and the input current performs current-limiting charging on the bus capacitor C1 after passing through the first PTC resistor Rp1 and the full-bridge rectifier circuit 203. A bus charging current gradually decreases as voltages at two ends of the bus capacitor increase, and resistance of the first PTC resistor Rp1 increases due to heating caused by the current flowing through the first PTC resistor Rp1, which suppresses the bus charging current, thereby suppressing a surge current.

The controller 30 determines, by using the first sampling signal for the input voltage of the power supply and the second sampling signal for the voltage of the direct current bus, whether an overvoltage exists.

The controller 30 may determine a current working status of the power converter by using the obtained first sampling signal and second sampling signal and a preset working status determining table. The working status determining table may be determined and stored in a memory in advance, and the controller 30 reads the working status determining table from the memory.

When determining that an overvoltage fault exists, the controller 30 performs overvoltage detachment control. The controller 30 controls the first switch unit S1 to be turned off, and when a voltage at a first input end IN1 is greater than or equal to a voltage at a second input end IN2, controls Q6 and Q7 to be turned off and controls Q8 and Q9 to be turned on, to bypass the bus capacitor C1. When the voltage at the first input end IN1 is less than the voltage at the second input end IN2, the controller 30 controls Q6 and Q7 to be turned on and controls Q8 and Q9 to be turned off, to bypass the bus capacitor C1. A resistance value of the first PTC resistor Rp1 increases rapidly due to heating. In one aspect, the circuit is protected, and in another aspect, a current flowing through the switching transistors in the second switch unit S2 is further limited.

The voltages at the two ends of the bus capacitor C1 gradually decrease because the bus capacitor C1 supplies power to other parts of the circuit. The bus capacitor C1 is charged when the controller 30 determines, by using the second sampling signal, that the voltage of the direct current bus is less than a third voltage threshold V3. In this case, when the voltage at the first input end IN1 is greater than or equal to the voltage at the second input end IN2, Q7 and Q8 are controlled to be turned off, and Q6 and Q9 are controlled to be turned on. When the voltage at the first input end IN1 is less than the voltage at the second input end IN2, Q7 and Q8 are controlled to be turned on, and Q6 and Q9 are controlled to be turned off. The voltages at the two ends of the bus capacitor C1 gradually increase. When determining, by using the second sampling signal, that the voltage of the direct current bus increases to exceed a fourth voltage threshold V4, the controller 30 determines that charging of the bus capacitor C1 is completed and continues to perform the foregoing overvoltage detachment control.

In some other possible implementations, freewheeling may be implemented by using body diodes of the controllable switching transistors Q6 to Q9. When the bus capacitor C1 needs to be charged, Q6 to Q9 are all controlled to be turned off, and the alternating current input charges the bus capacitor by using a freewheeling loop formed by the body diodes.

The third voltage threshold V3 is less than the fourth voltage threshold V4, and the fourth voltage threshold V4 is less than or equal to a second voltage threshold V2. In a preferred implementation, the fourth voltage threshold V4 is less than the second voltage threshold V2.

Through the foregoing control performed by the controller 30, the voltages at the two ends of the bus capacitor C1 maintain between the third voltage threshold V3 and the fourth voltage threshold V4, to ensure that the bus capacitor C1 can always supply power normally in a long-term overvoltage condition, for example, supply power to the controller of the power conversion circuit.

After determining that the overvoltage fault is cleared, the controller 30 controls the first switch unit S1 to be turned on, to bypass the first PTC resistor Rp1, so that the power conversion circuit can work normally.

In some embodiments, the controller 30 may be integrated with the controller of the power conversion circuit, that is, the controller may further control a working status of the power conversion circuit.

The following uses an example in which an output end of the AC-DC-AC converter is connected to a power grid to describe a principle of implementing surge current suppression and overvoltage protection by the protection circuit.

When the output end of the AC-DC-AC converter is connected to the power grid, voltage fluctuation of the power grid also affects security of the converter. Therefore, corresponding protection needs to be performed on the converter when an overvoltage fault occurs in the power grid.

In this case, the controller of the protection circuit is further configured to determine, by using a third sampling signal at an output end of the power conversion circuit, whether an overvoltage occurs in a voltage of the power grid.

The controller may perform determining by using the third sampling signal and a preset working status determining table. The working status determining table may be determined and stored in a memory in advance, and the controller reads the working status determining table from the memory.

When determining that an overvoltage occurs in the voltage of the power grid, the controller controls the third switch unit S3 to be turned off, and controls the controllable switching transistor included in the fourth switch unit, so that the output end of the power conversion circuit is disconnected from the direct current bus. When a voltage at OUT1 is greater than or equal to a voltage at OUT2, the controller controls Q12 and Q13 to be turned on and controls Q10 and Q11 to be turned off; and when the voltage at OUT1 is less than the voltage at OUT2, the controller controls Q10 and Q11 to be turned on controls Q12 and Q13 to be turned off, to bypass the bus capacitor C1, so that the power grid side cannot charge the bus capacitor C1.

After determining, by using the third sampling signal, that the overvoltage fault in the power grid is recovered, the controller turns on the third switch unit, and the power conversion circuit recovers to work again.

In some embodiments, the controllable switching transistors Q6 to Q13 may be simultaneously included in the second switch unit. In this case, there is no fourth switch unit.

When the input end and the output end of the AC-DC-AC converter are interchanged, the rectifier circuit is equivalent to the inverse conversion circuit, and the inverse conversion circuit is equivalent to the rectifier circuit. Working principles of the protection circuit and the controller are similar to those described above. Details are not described again in this embodiment.

In conclusion, the power converter provided in this embodiment is the AC-DC-AC converter. The protection circuit of the power converter uses a feature of a positive temperature coefficient of a PTC resistor to implement an input soft-start requirement. The PTC resistor does not need to be connected in series to an additional relay, and the controllable switching transistor in the power conversion circuit is multiplexed, so that a quantity of used relays is decreased, and costs of the power converter are reduced, thereby facilitating miniaturization of the power converter. In a long-term overvoltage condition, the first switch unit is in a normally open state, and does not frequently switch a working status, thereby prolonging a service periodicity of the first switch unit. The bus capacitor is charged by controlling the working status of the controllable switching transistor, so that the controller of the power converter can normally obtain power, thereby avoiding adhesion and sparking caused by use of a relay and improving reliability of the power converter. In addition, when the output end is connected to the power grid to perform a grid connection operation, if an overvoltage fault occurs in the power grid, overvoltage protection can be further performed by using the PTC resistor connected to the output end side, and the power grid is disconnected from the direct current bus in time, to prevent the power grid from charging the bus capacitor.

For an implementation of each of the controllers in Embodiment 2 to Embodiment 7, refer to FIG. 7. The sampling processor may cooperate with different sampling circuits (for example, an alternating current sampling circuit and a direct current sampling circuit) and different sampling manners (for example, single-ended sampling or differential sampling) based on different inputs, and an implementation of the second driving unit 502 may need to correspond to different second switch units.

It may be understood that Embodiment 2 to Embodiment 7 may all be described by using an example in which the second switch unit multiplexes the controllable switching transistor in the power conversion circuit. When the controllable switching transistor included in the second switch unit is independently disposed, another corresponding implementation may be obtained. For example, referring to FIG. 5, in this case, the controller may control Q0 to directly bypass the direct current bus, or control Q0 to be turned off and control a working status of the controllable switching transistor in the power conversion circuit to charge the bus capacitor.

Based on the power converters provided in the foregoing embodiments, the embodiments may further provide a method for protecting a power converter, which is described below with reference to the accompanying drawings.

FIG. 15 is a flowchart of a method for protecting a power converter according to an embodiment.

For an implementation and a working principle of a power converter, refer to related descriptions in the foregoing embodiments. Details are not described herein again in this embodiment.

The method includes the following steps.

S1501: Determine, by using at least one of a first sampling signal for an input voltage of a power supply or a second sampling signal for a voltage of a direct current bus, whether an overvoltage exists.

In some embodiments, it is determined that an overvoltage exists when it is determined, by using the first sampling signal, that the voltage of the external power supply is greater than a first voltage threshold, or it is determined, by using the second sampling signal, that the voltage of the direct current bus is greater than a second voltage threshold. In this case, overvoltage determining of a controller has high sensitivity, and subsequent overvoltage detachment control can be performed in time.

In some other embodiments, it is determined that an overvoltage exists when it is determined, by using the first sampling signal, that the voltage of the external power supply is greater than the first voltage threshold, and it is determined, by using the second sampling signal, that the voltage of the direct current bus is greater than the second voltage threshold. In this case, overvoltage determining of the controller has a degree of fault tolerance, and frequent overvoltage detachment control can be avoided.

S1502: When it is determined that an overvoltage exists, control a first switch unit to be turned off, and control a working status of a controllable switching transistor to charge a bus capacitor of a power conversion circuit.

When it is determined, by using the second sampling signal, that the voltage of the direct current bus is less than a third voltage threshold, the working status of the controllable switching transistor is controlled to charge the bus capacitor; and when it is determined, by using the second sampling signal, that the voltage of the direct current bus is greater than or equal to a fourth voltage threshold, the working status of the controllable switching transistor is controlled to stop charging the bus capacitor.

The third voltage threshold is less than the fourth voltage threshold, and the fourth voltage threshold is less than or equal to the second voltage threshold. In a preferred implementation, the fourth voltage threshold is less than the second voltage threshold.

In conclusion, according to the method for protecting a power converter provided in this embodiment, an input soft-start requirement is implemented. In a long-term overvoltage condition, the first switch unit is in a normally open state, and does not frequently switch a working status, thereby prolonging a service periodicity of the first switch unit. The bus capacitor is charged by controlling the working status of the controllable switching transistor, so that the controller of the power converter can normally obtain power. Compared with the conventional technology, adhesion and sparking caused by use of a relay are avoided, thereby improving reliability of the power converter.

Based on the power converters provided in the foregoing embodiments, the embodiments may further provide a power supply system, which is described below with reference to the accompanying drawings.

FIG. 16 is a schematic diagram of a power supply system according to an embodiment.

A power supply system 1600 shown in the figure includes a power supply 1601 and a power converter 1602.

The power converter 1602 includes a protection circuit, a power conversion circuit, and a controller.

The protection circuit is configured to perform surge current suppression and overvoltage protection.

For an implementation and working principle of the power converter 1602, refer to related descriptions in the foregoing embodiments. Details are not described herein again in this embodiment.

The power converter may be a DC-DC converter, an AC-DC converter, a DC-AC converter, an AC-DC-AC converter, and the like. This is not limited to this embodiment.

When an input end of the power converter is connected to an alternating current input, a power supply connected to the input end of the power converter provides an alternating current, for example, the input end of the power converter may be connected to mains electricity.

When the input end of the power converter is connected to a direct current input, the power supply connected to the input end of the power converter provides a direct current, for example, the input end of the power converter may be connected to a battery pack or a photovoltaic module, which are separately described below.

Figure 17:
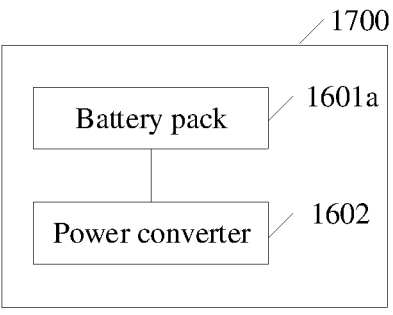
FIG. 17 is a schematic diagram of a battery system according to an embodiment.

FIG. 17 is a schematic diagram of a battery system according to an embodiment.

A battery system 1700 shown in the figure includes a battery pack 1601 and a power converter 1602.

The battery pack 1601a is configured to provide a direct current output. The power converter 1602 may be a DC-DC converter or a DC-AC converter. This is not limited to this embodiment.

Figure 18:
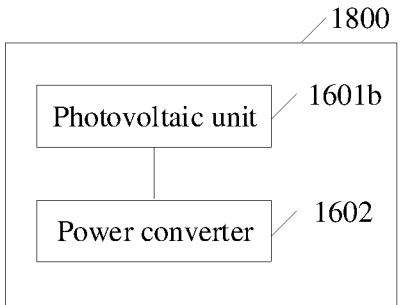
FIG. 18 is a schematic diagram of a photovoltaic system according to an embodiment.

FIG. 18 is a schematic diagram of a photovoltaic system according to an embodiment.

A photovoltaic system 1800 shown in the figure includes a photovoltaic unit 1601b and a power converter 1602.

The photovoltaic unit 1601b includes one photovoltaic module or more photovoltaic modules. When the photovoltaic unit 1601b includes a plurality of photovoltaic modules, the photovoltaic modules may be first connected in series to form a photovoltaic string, and then a plurality of photovoltaic strings are connected in parallel to form a photovoltaic module.

The photovoltaic unit 1601b is configured to convert light energy (solar energy) into a direct current and then provide the direct current to the power converter 1602.

When the power converter 1602 is a DC-DC converter, an output end of the power converter 1602 may be connected to an inverter.

When the power converter 1602 is a DC-AC converter, the output end of the power converter 1602 may be connected to a power grid to perform a grid connection operation.

In conclusion, the power supply system provided in the embodiments includes the power converter. The power converter implements an input soft-start requirement by using a feature that a PTC resistor has a positive temperature coefficient, and the PTC resistor does not need to be connected in series to an additional relay. Compared with the conventional technology, a quantity of used relays is decreased, and costs of the power converter are reduced, thereby facilitating miniaturization of the power converter. The first PTC resistor may further limit a current flowing through the second switch unit, so that in a long-term overvoltage condition, a bus capacitor can be charged by controlling the working status of the controllable switching transistor with a small rated current, and the controller of the power converter can normally obtain power to avoid using a relay, thereby avoiding adhesion and sparking. Therefore, reliability of the power converter is further improved.

In addition, the protection circuit of the power converter may multiplex the controllable switching transistor in the power conversion circuit, and overvoltage detachment can be implemented without adding an additional relay or switch device, thereby reducing costs and saving space.

It should be understood that, "at least one (item)" refers to one or more, and "a plurality of" refers to two or more. "And/or" is used for describing an association relationship between associated objects and represents that three relationships may exist. For example, "A and/or B" may represent the following three cases: Only A exists, only B exists, and both A and B exist, where A and B may be singular or plural. The character "/" may indicate an "or" relationship between associated objects. "At least one of the following items (pieces)" or a similar expression thereof refers to any combination of these items, including any combination of singular items (pieces) or plural items (pieces). For example, at least one item (piece) of a, b, or c may indicate: a, b, c, "a and b", "a and c", "b and c", or "a, b, and c", where a, b, and c may be singular or plural.

Embodiments are all described in a progressive manner, same or similar parts between embodiments may be mutually referenced, and each embodiment focuses on a difference from other embodiments. In addition, some or all of the units and modules may be selected based on an actual requirement, to achieve objectives of the solutions in embodiments. A person of ordinary skill in the art may understand and implement embodiments without creative efforts.

The foregoing descriptions are merely implementations. It should be noted that a person of ordinary skill in the art may further make several improvements and polishing that shall fall within the scope of the embodiments.

What is claimed is:

1. A power converter, configured to connect to a power supply, wherein the power converter comprises
   a protection circuit,
   a controller, and
   a power conversion circuit, and the protection circuit comprises:
      a first positive temperature coefficient (PTC) resistor,
      a first switch unit, and
      a second switch unit, and the power conversion circuit comprises
   a direct current bus that comprises
      a positive direct current bus and
      a negative direct current bus,
      a bus capacitor that is connected in parallel between the positive direct current bus and the negative direct current bus, and
      a diode is disposed between the bus capacitor and the second switch unit;
   the first switch unit is connected between the power supply and an input end of the power conversion circuit, or is connected in series on the direct current bus of the power conversion circuit;
   the first PTC resistor is connected in parallel to the first switch unit;
   the second switch unit is connected in parallel between a positive port and a negative port of the input end of the power conversion circuit, or is connected in parallel between the positive direct current bus and the negative direct current bus;
   the second switch unit comprises a controllable switching transistor; and
   the controller is configured to:

(i) when at least one of the following is met: determining that a voltage of the power supply is greater than a first voltage threshold; or determining that a voltage of the direct current bus is greater than a second voltage threshold; control the first switch unit to be turned off, and control the controllable switching transistor in the second switch unit; and (ii) while the first switch unit remains turned off, when determining, based on a second sampling signal indicative of the voltage of the direct current bus, that the voltage of the direct current bus is less than a third voltage threshold, control the controllable switching transistor to charge the bus capacitor; and when determining, based on the second sampling signal, that the voltage of the direct current bus is greater than or equal to a fourth voltage threshold, control the controllable switching transistor to stop charging the bus capacitor, wherein the third voltage threshold is less than the fourth voltage threshold, and the fourth voltage threshold is less than or equal to the second voltage threshold.

2. The power converter according to claim 1, wherein the controllable switching transistor comprised in the second switch unit is the controllable switching transistor of the power conversion circuit.

3. The power converter according to claim 1, wherein the power supply is an alternating current power supply, the power conversion circuit comprises a full-bridge rectifier circuit and a boost circuit, and the boost circuit comprises a first inductor, a first diode, a first switching tube, and the bus capacitor;
   a first output end of the full-bridge rectifier circuit is connected to a first end of the first inductor, a second end of the first inductor is connected to a second output end of the full-bridge rectifier circuit by using the first switching tube, the second end of the first inductor is connected to an anode of the first diode, a cathode of the first diode is connected to a first end of the bus capacitor, and the second output end of the full-bridge rectifier circuit is connected to a second end of the bus capacitor;
   the second switch unit is the first switching tube; and
   when determining that the voltage of the direct current bus is less than the third voltage threshold, the controller controls the first switching tube to be turned off; and
   when determining that the voltage of the direct current bus is greater than or equal to the fourth voltage threshold, the controller controls the first switching tube to be turned on.

4. The power converter according to claim 3, wherein the first switch unit is located between the power supply and an input end of the full-bridge rectifier circuit, or
   located between an output end of the full-bridge rectifier circuit and the boost circuit.

5. The power converter according to claim 1, wherein the power supply is an alternating current power supply, the power conversion circuit comprises a full-bridge rectifier circuit and a boost circuit, and the boost circuit comprises a second inductor, a third inductor, a second diode, a third diode, a second switching tube, a third switching tube, and the bus capacitor;
   a first output end of the full-bridge rectifier circuit is connected to a first end of the second inductor and a first end of the third inductor, a second end of the second inductor is connected to a second output end of the full-bridge rectifier circuit by using the second switching tube, a second end of the third inductor is connected to the second output end of the full-bridge rectifier circuit by using the third switching tube, the second end of the second inductor is connected to an anode of the second switching tube, a cathode of the second diode is connected to a first end of the bus capacitor, the second end of the third inductor is connected to an anode of the third diode, a cathode of the third diode is connected to the first end of the bus capacitor, and the second output end of the full-bridge rectifier circuit is connected to a second end of the bus capacitor;

the second switch unit comprises the second switching tube and the third switching tube; and when determining that the voltage of the direct current bus is less than the third voltage threshold, the controller controls the second switching tube and the third switching tube to be turned off, or controls the second switching tube and the third switching tube to be alternately turned on; and when determining that the voltage of the direct current bus is greater than or equal to the fourth voltage threshold, the controller controls both the second switching tube and the third switching tube to be turned on.

6. The power converter according to claim 1, wherein the power supply is an alternating current power supply, the power conversion circuit is a boost circuit, and the boost circuit comprises a fourth inductor, wherein the second switch unit comprises a pair of transistors including a first transistor and a second transistor, a first end of the fourth inductor is connected to a first end of the power supply by using the first PTC resistor, a second end of the fourth inductor is connected to a first end of the bus capacitor by using the first transistor, the second end of the fourth inductor is connected to a second end of the bus capacitor by using the second transistor, wherein the controllable switching transistor in the second switch unit is one of the pair of transistors.

7. The power converter according to claim 1, wherein the power supply is a direct current power supply, and the power conversion circuit is one of a boost circuit, a buck circuit, a buck-boost circuit, a full-bridge circuit, a forward conversion circuit, a phase-shift full-bridge conversion circuit, an LLC resonant conversion circuit, or a DC-AC circuit.

8. The power converter according to claim 1, wherein the power supply is an alternating current power supply, the power conversion circuit is an AC-DC-AC circuit, and the power conversion circuit comprises a rectifier circuit, an inverse conversion circuit, and the bus capacitor;

the protection circuit further comprises a second PTC resistor, a third switch unit, and a fourth switch unit;

the second PTC resistor is connected in series between a first output end of the inverse conversion circuit and a first output end of the power converter, and the third switch unit is connected in parallel to the second PTC resistor;

the second switch unit comprises a controllable switching tube in the rectifier circuit;

the fourth switch unit comprises a controllable switching tube in the inverse conversion circuit; and when determining that the voltage of the direct current bus is less than the third voltage threshold, the controller controls the second switch unit and the fourth switch unit to charge the bus capacitor; and when determining that the voltage of the direct current bus is greater than or equal to the fourth voltage threshold, the controller controls the second switch unit and the fourth switch unit to stop charging the bus capacitor.

9. The power converter according to claim 8, wherein an output end of the power conversion circuit is connected to a power grid, and when determining, based on a third sampling signal at the output end of the power conversion circuit, that an overvoltage occurs in the power grid, the controller controls the third switch unit to be turned off, and controls the controllable switching tube comprised in the fourth switch unit, so that the output end of the power conversion circuit is disconnected from the direct current bus.

10. The power converter according to claim 1, wherein the controller is further configured to control a working status of the power conversion circuit.

11. The power converter according to claim 1, wherein the first switch unit is a relay, or the first switch unit is a controllable switching transistor and a relay that are connected in parallel.

12. The power converter according to claim 1, further comprising:

a driving circuit configured to change working statuses of the first switch unit and the second switch unit under control of the controller.

13. The power converter according to claim 1, wherein the second switch unit comprises one controllable switching transistor, or the second switch unit comprises a plurality of controllable switching transistors connected in parallel.

14. A power supply system, comprising a power converter, and an alternating current power supply, wherein the alternating current power supply is connected to an input end of the power converter, and is configured to provide an alternating current for the power converter; the power converter comprises a protection circuit, a controller, and a power conversion circuit, the protection circuit comprises a first positive temperature coefficient (PTC) resistor, a first switch unit, and a second switch unit, the power conversion circuit comprises a direct current bus, and the direct current bus comprises a positive direct current bus;

a negative direct current bus;

a bus capacitor that is connected in parallel between the positive direct current bus and the negative direct current bus; and a diode is disposed between the bus capacitor and the second switch unit, and the first switch unit is connected between the power supply and an input end of the power conversion circuit, or is connected in series on the direct current bus of the power conversion circuit;

the first PTC resistor is connected in parallel to the first switch unit;

the second switch unit is connected in parallel between a positive port and a negative port of the input end of the power conversion circuit, or is connected in parallel between the positive direct current bus and the negative direct current bus;

the second switch unit comprises a controllable switching transistor; and the controller is configured to:

(i) when at least one of the following is met: determining that a voltage of the power supply is greater than a first voltage threshold; or determining that a voltage of the direct current bus is greater than a second voltage threshold; control the first switch unit to be turned off, and control the controllable switching transistor in the second switch unit; and (ii) while the first switch unit remains turned off, when determining, based on a second sampling signal indicative of the voltage of the direct current bus, that the voltage of the direct current bus is less than a third voltage threshold, control the controllable switching transistor to charge the bus capacitor; and when determining, based on the second sampling signal, that the voltage of the direct current bus is greater than or equal to a fourth voltage threshold, control the controllable switching transistor to stop charging the bus capacitor, wherein the third voltage threshold is less than the fourth voltage threshold, and the fourth voltage threshold is less than or equal to the second voltage threshold.

15. A power supply system, comprising
a power converter, and
a direct current power supply, wherein the direct current power supply is connected to an input end of the power converter, and is configured to provide a direct current for the power converter;
the power converter comprises
a protection circuit,
a controller, and
a power conversion circuit, the protection circuit comprises
a first positive temperature coefficient (PTC) resistor,
a first switch unit, and
a second switch unit, the power conversion circuit comprises a pair of transistors having antiparallel body diodes configured to perform freewheeling, and
a direct current bus, and the direct current bus comprises
a positive direct current bus;
a negative direct current bus;

a bus capacitor that is connected in parallel between the positive direct current bus and the negative direct current bus; and
a diode is disposed between the bus capacitor and the second switch unit; and
the first switch unit is connected between the power supply and an input end of the power conversion circuit, or is connected in series on the direct current bus of the power conversion circuit;
the first PTC resistor is connected in parallel to the first switch unit;
the second switch unit is connected in parallel between a positive port and a negative port of the input end of the power conversion circuit, or is connected in parallel between the positive direct current bus and the negative direct current bus;
the second switch unit comprises a controllable switching transistor; and
the controller is configured to:

(i) when at least one of the following is met: determining that a voltage of the direct current power supply is greater than a first voltage threshold; or determining that a voltage of the direct current bus is greater than a second voltage threshold; control the first switch unit to be turned off, and control the controllable switching transistor in the second switch unit; and (ii) while the first switch unit remains turned off, when determining, based on a second sampling signal indicative of the voltage of the direct current bus, that the voltage of the direct current bus is less than a third voltage threshold, control the controllable switching transistor to charge the bus capacitor; and when determining, based on the second sampling signal, that the voltage of the direct current bus is greater than or equal to a fourth voltage threshold, control the controllable switching transistor to stop charging the bus capacitor, wherein the third voltage threshold is less than the fourth voltage threshold, and the fourth voltage threshold is less than or equal to the second voltage threshold.

16. The power supply system according to claim 15, wherein the direct current power supply is a battery pack or a photovoltaic module.

* * * * *